United States Patent
Kuno

(10) Patent No.: US 9,607,218 B2
(45) Date of Patent: Mar. 28, 2017

(54) INFORMATION PROCESSING APPARATUS, CONTROL METHOD, AND STORAGE MEDIUM STORING PROGRAM

(71) Applicant: CANON KABUSHIKI KAISHA, Tokyo (JP)

(72) Inventor: Koichi Kuno, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/810,793

(22) Filed: Jul. 28, 2015

(65) Prior Publication Data
US 2016/0048729 A1    Feb. 18, 2016

(30) Foreign Application Priority Data
Aug. 12, 2014    (JP) .................. 2014-164532

(51) Int. Cl.
*G06K 9/00* (2006.01)

(52) U.S. Cl.
CPC ................ *G06K 9/00456* (2013.01)

(58) Field of Classification Search
CPC ......... G06T 7/0081; G06T 2207/20144; G06T 7/0083; G06T 2207/10016; G06K 9/38
See application file for complete search history.

(56) References Cited

FOREIGN PATENT DOCUMENTS

| JP | 2000-295570 A | 10/2000 |
| JP | 2007-174589 A | 7/2007 |

*Primary Examiner* — Duy M Dang
(74) *Attorney, Agent, or Firm* — Fitzpatrick, Cella, Harper & Scinto

(57) ABSTRACT

A plurality of regions corresponding to respective attributes in an image are detected, and a target region serving as a thumbnail image out of the plurality of regions is determined. Thumbnail image data is generated from data corresponding to the determined target region.

20 Claims, 22 Drawing Sheets

TEXT REGION HISTOGRAM

PHOTOGRAPH REGION HISTOGRAM

MARGIN REGION HISTOGRAM

F I G. 10
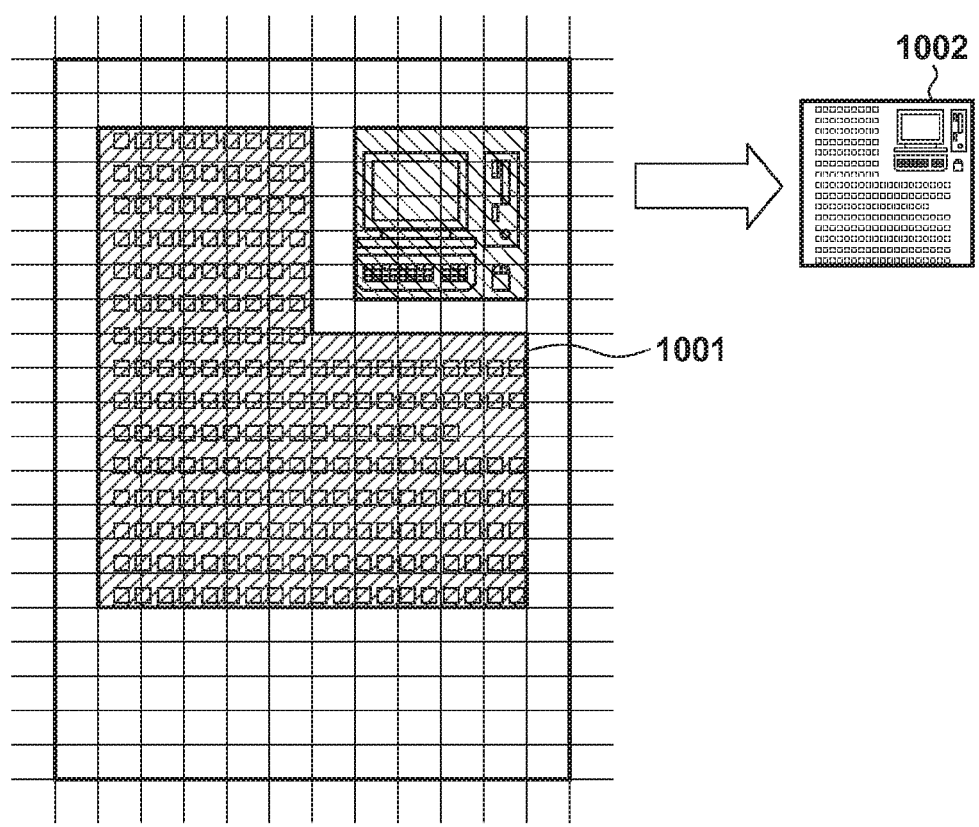

F I G. 12
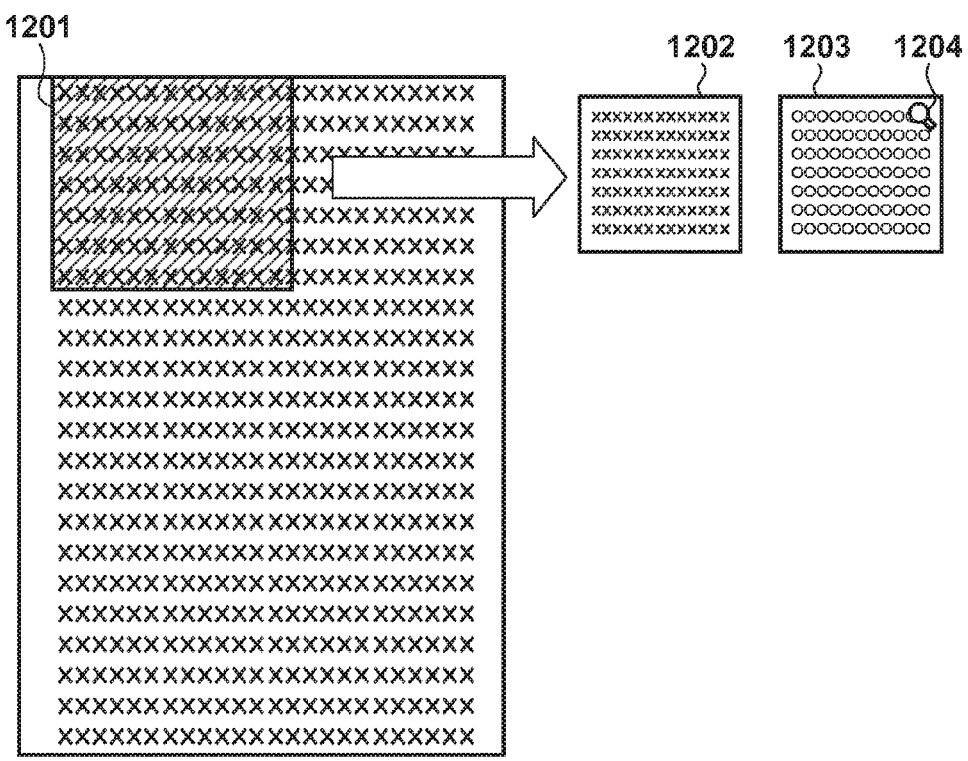

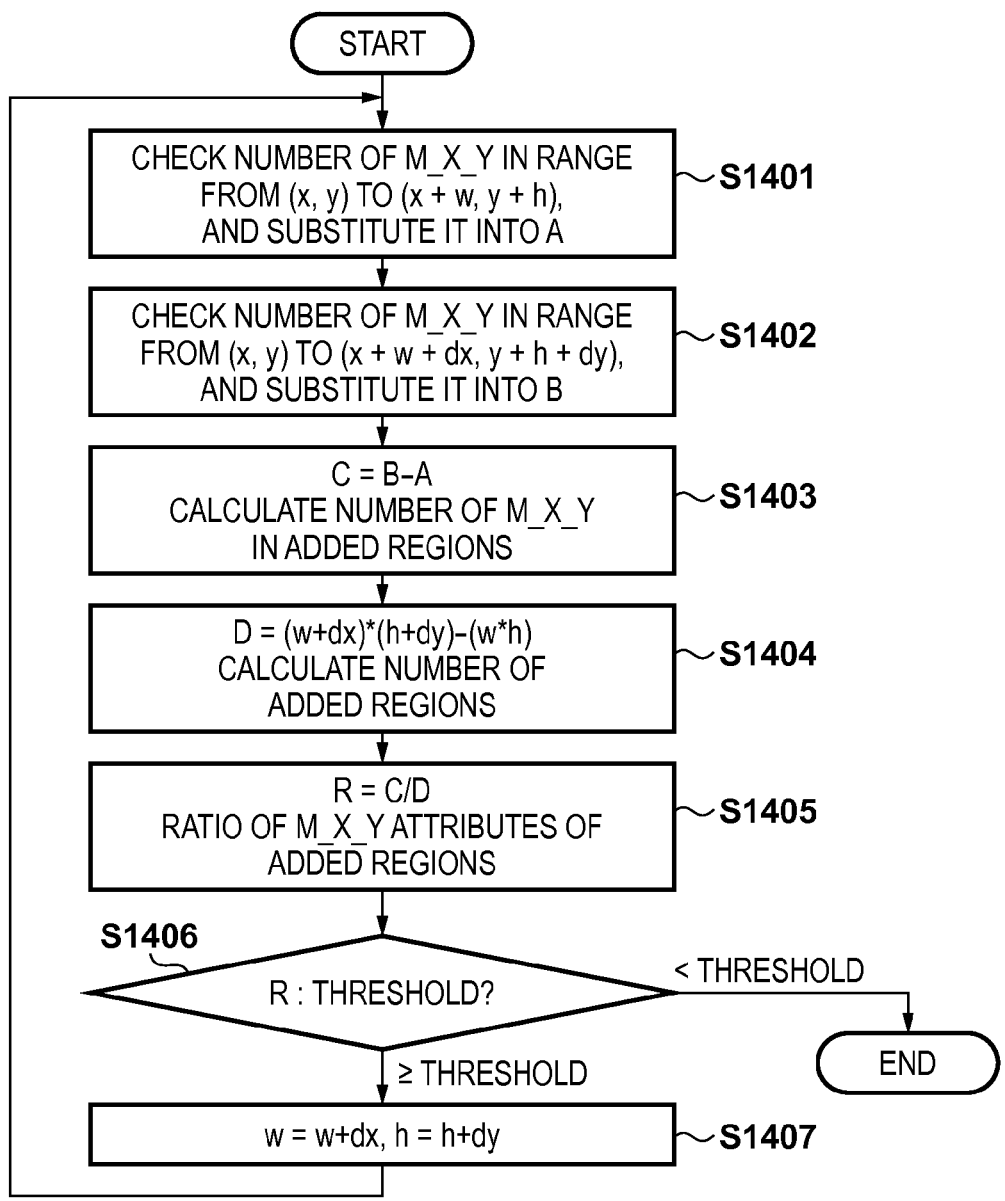
F I G. 14

INFORMATION PROCESSING APPARATUS, CONTROL METHOD, AND STORAGE MEDIUM STORING PROGRAM

BACKGROUND OF THE INVENTION

Field of the Invention

The present invention relates to an information processing apparatus and control method for generating a thumbnail image, and a storage medium storing a program.

Description of the Related Art

In some cases, thumbnail images are generated by reducing image data, listed, and displayed to prompt a user to select a desired thumbnail image. Depending on the contents of an image, the contents may not be identified upon reducing image data. Thus, there are known a method of extracting an in-focus region in a photograph and generating a thumbnail image (Japanese Patent Laid-Open No. 2000-295570), and a method of extracting a range so that the size of the face of a detected person becomes constant (Japanese Patent Laid-Open No. 2007-174589).

In the related art, a specific region in an image is extracted as the region of a thumbnail image. However, a region that should be included in a thumbnail image sometimes exists in addition to a specific region as mentioned above. For example, the target of a thumbnail image is data including various regions of a document, table, and the like, such as Office document data. Even if a thumbnail image is created for such data by paying attention to only a specific region, even another region may be appropriate as a thumbnail image.

SUMMARY OF THE INVENTION

An aspect of the present invention is to eliminate the above-mentioned problems with the conventional technology. The present invention provides an information processing apparatus and control method for preventing degradation of the identifiability of a thumbnail image, and a storage medium storing a program.

The present invention in one aspect provides an information processing apparatus comprising: a detection unit configured to detect a plurality of regions corresponding to respective attributes in an image; a determination unit configured to determine a target region serving as a thumbnail image out of the plurality of regions detected by the detection unit; and a generation unit configured to generate thumbnail image data from data corresponding to the target region determined by the determination unit, wherein the determination unit determines, based on an attribute of a first region and an attribute of a second region out of the plurality of regions, whether both of the first region and the second region are included in the target region or one of the first region and the second region is included in the target region.

According to the present invention, degradation of the identifiability of a thumbnail image can be prevented.

Further features of the present invention will become apparent from the following description of exemplary embodiments with reference to the attached drawings.

BRIEF DESCRIPTION OF THE DRAWINGS

FIG. 10 is a view showing a specified display target region;

FIG. 12 is a view showing the display target region of an image having no photograph region;

FIG. 14 is a flowchart showing processing of widening the region of a large block;

DESCRIPTION OF THE EMBODIMENTS

Figure 1:
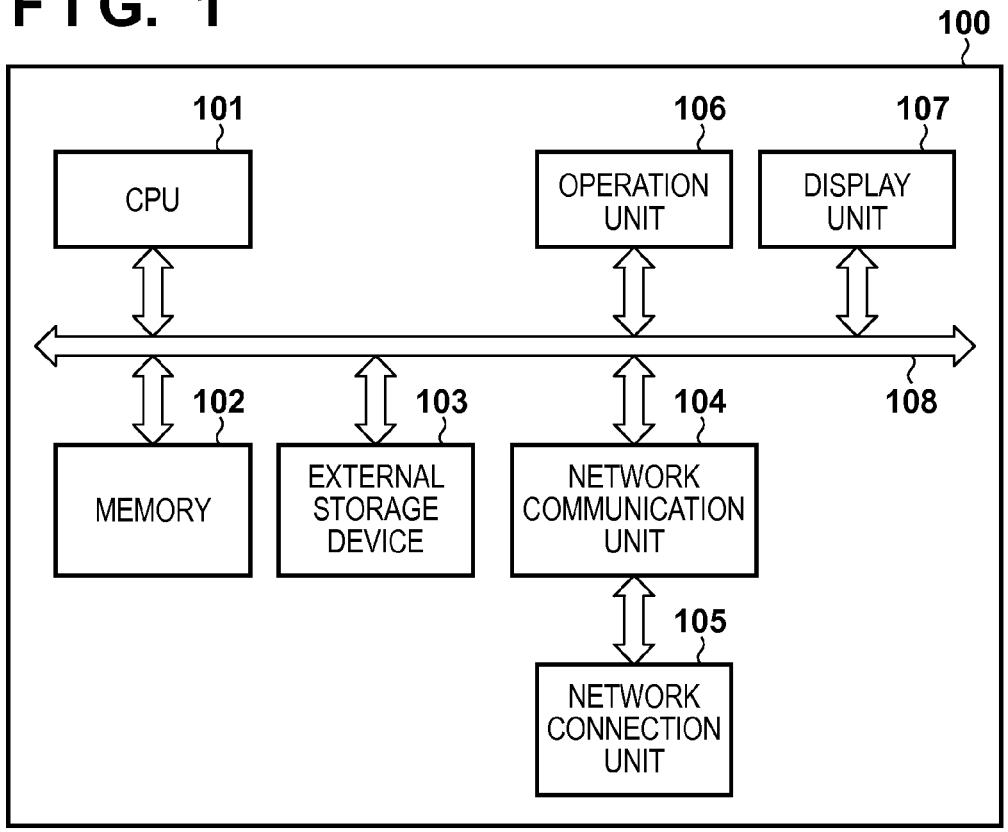
FIG. 1 is a block diagram showing the schematic arrangement of an information processing apparatus.

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that the same reference numerals denote the same parts, and a repetitive description thereof will be omitted.

First Embodiment

FIG. 1 is a block diagram showing the schematic arrangement of an information processing apparatus according to the first embodiment. For example, a general-purpose PC is used as an information processing apparatus 100. In this embodiment, the information processing apparatus 100 operates as, for example, an image processing apparatus that displays the thumbnail image of image data. A CPU 101 controls each unit of the information processing apparatus 100 and implements the function of the information processing apparatus 100. A memory 102 is used as a temporary storage for data, such as the working memory of the CPU 101 and buffering. An external storage device 103 stores application programs, an OS, image data, various files, and the like. A display unit 107 is, for example, an LCD. An operation unit 106 includes, for example, a keyboard and a pointing device. A network communication unit 104 allows communication between the information processing apparatus 100 and each apparatus on a network such as an external LAN. A network connection unit 105 connects the network communication unit 104 to a network such as an external LAN. The external network may be a wired network or a wireless network. The units ranging from the CPU 101 to the display unit 107 are connected so that they can communicate with each other via a system bus 108. The display unit 107 displays a thumbnail image under the control of the CPU 101. Note that the display unit 107 may be incorporated in the information processing apparatus 100, or a thumbnail image may be displayed on a display apparatus outside the information processing apparatus 100.

Figure 2:
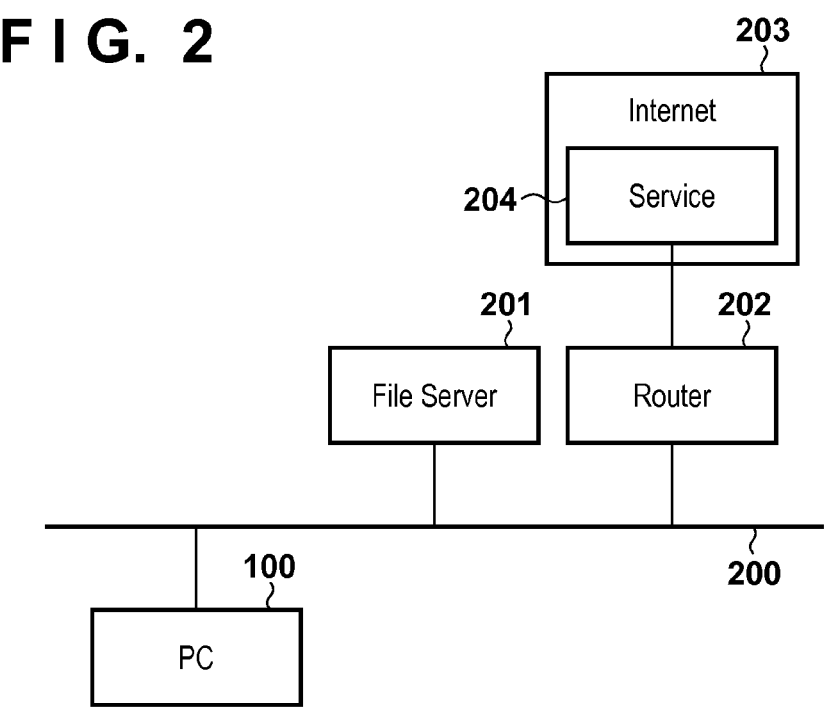
FIG. 2 is a block diagram showing the schematic arrangement of a system including the information processing apparatus.

FIG. 2 is a block diagram showing the schematic arrangement of a system including the information processing apparatus 100. The information processing apparatus 100 is connected so that it can communicate with an apparatus on a network via a local area network 200. The image data is saved in the external storage device 103 of the information processing apparatus 100 in some cases, or saved in a file server 201 on the local area network 200 in other cases. When the information processing apparatus 100 is connected to Internet 203 via a router 202, image data is sometimes provided from a service 204 on the Internet 203.

Figure 3:
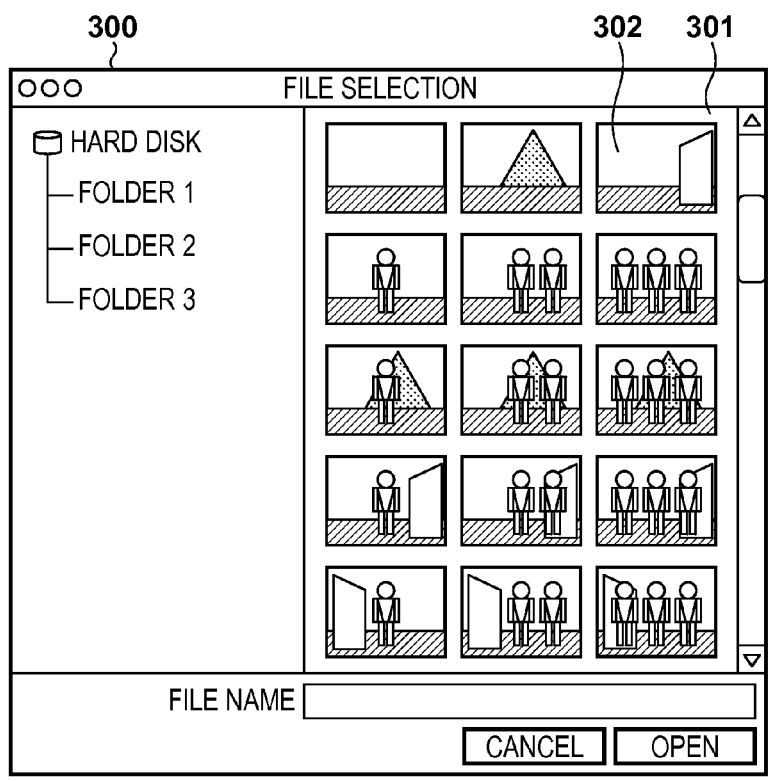
FIG. 3 is a view showing a screen that displays a thumbnail image.

FIG. 3 is a view showing a window 300 for accepting selection of a file, as an example of a user interface screen that displays a thumbnail image. To accept selection of a file, thumbnail images 302 each serving as the image of file contents are displayed in a file selection region 301. In FIG. 3, the images of a photograph and the like are displayed as thumbnail images.

Figure 4:
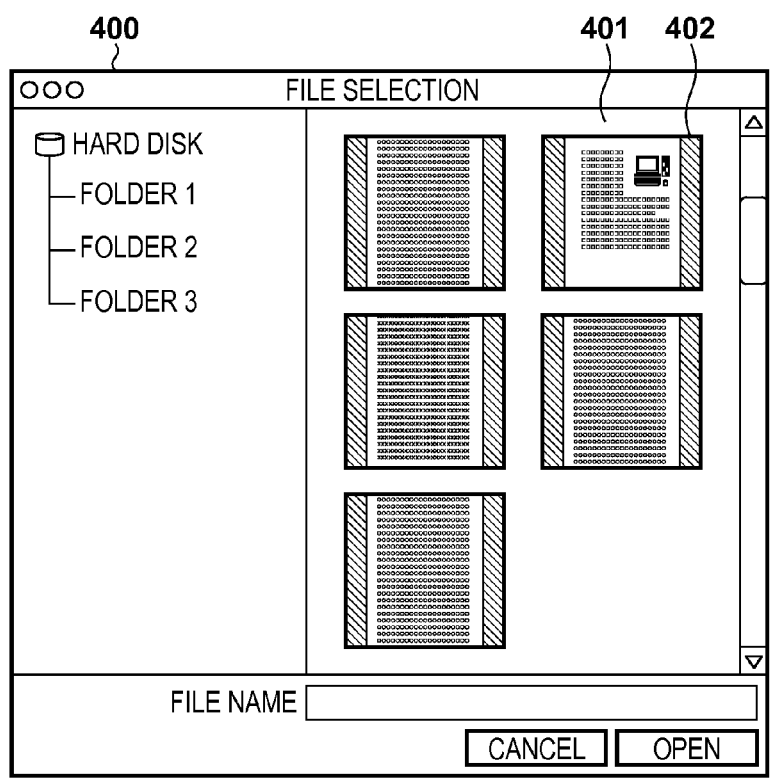
FIG. 4 is a view showing another screen that displays a thumbnail image.

FIG. 4 is a view showing a window 400 for accepting selection of a file, as an example of a user interface screen that displays a thumbnail image, as in FIG. 3. In FIG. 4, the scanned images of document data read by a scanner or the like are displayed as thumbnail images. As shown in FIG. 4, a scanned image contains large amounts of characters and margins. Thus, if the scanned image is directly converted into a thumbnail image, the identifiability of each thumbnail image becomes poorer than that of the thumbnail image shown in FIG. 3.

Figure 5:
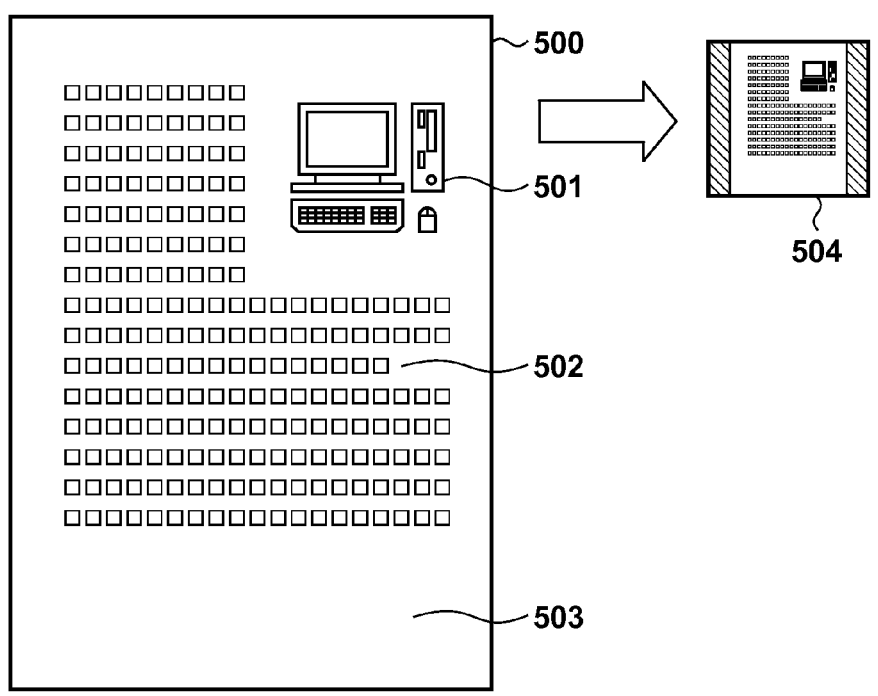
FIG. 5 is a view showing a bitmap image.

FIG. 5 is a view showing an example of a bitmap image 500 captured by a scanner or a digital camera. The image 500 includes three types of regions: a photograph region 501, a text region 502, and a margin region 503. A thumbnail image 504 is a thumbnail image created by reducing the entire image 500 including all these data. Since the thumbnail image 504 includes even a margin, as shown in FIG. 5, regions having no information exist at the top and bottom. When accepting selection of document data from a thumbnail image, information of the margin portion is unnecessary information in general, and the margin portion narrows the important photograph region 501 and text region 502. In this embodiment, unnecessary information in a thumbnail image is deleted when displaying the thumbnail image.

Figure 6:
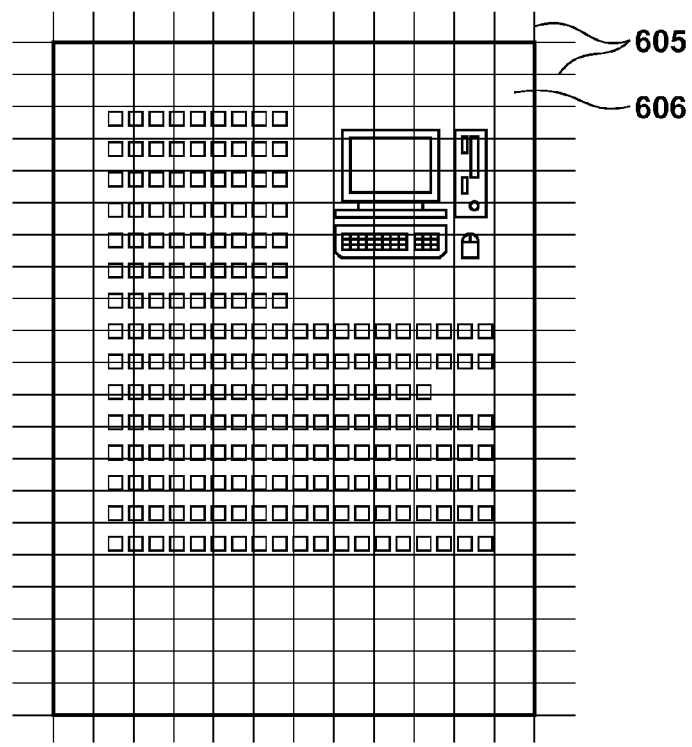
FIG. 6 is a conceptual view showing a state in which an image is divided into a plurality of blocks.

In this embodiment, a photograph region, a text region, and a margin region in image data are extracted by region segmentation processing of detecting the regions of objects of respective attributes. For example, as shown in FIG. 6, an image is divided into a plurality of blocks 606 by block separation lines 605, and the attribute of each block is analyzed. In FIG. 6, the block is represented by a square. However, when determining a region type by the shape or number of edges, the block may be a rectangle having an arbitrary ratio. The block size may be a size equivalent to one character that appears frequently.

Figures 7A, 7B, 7C:
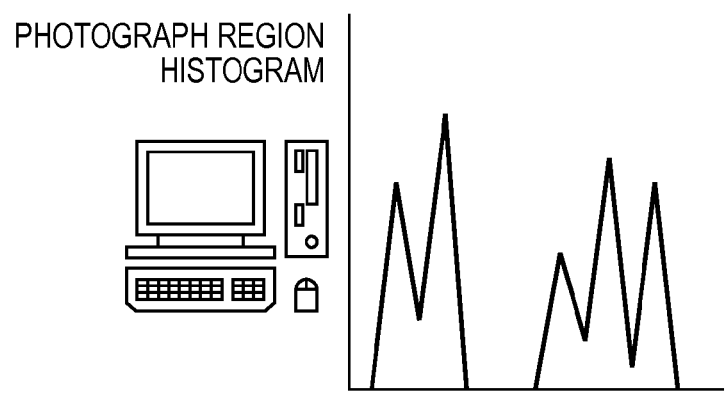
FIGS. 7A to 7C are views for explaining the features of the histograms of respective attributes.

As the method of analyzing the attribute of each block, for example, the histogram of pixel values (for example, densities) in each block is obtained, and the attribute is determined based on the angle or number of edges included in the block. As shown in FIG. 7A, the histogram in the character string region has many edges (A character "W" is shown as an example.), and the amplitude is almost constant and has a large value. As shown in FIG. 7B, the histogram in the photograph region has a plurality of edges with different values as a whole. As shown in FIG. 7C, the histogram in the margin region hardly has an edge. Based on these features, an attribute to which a histogram analysis target block belongs is determined.

Figure 8:
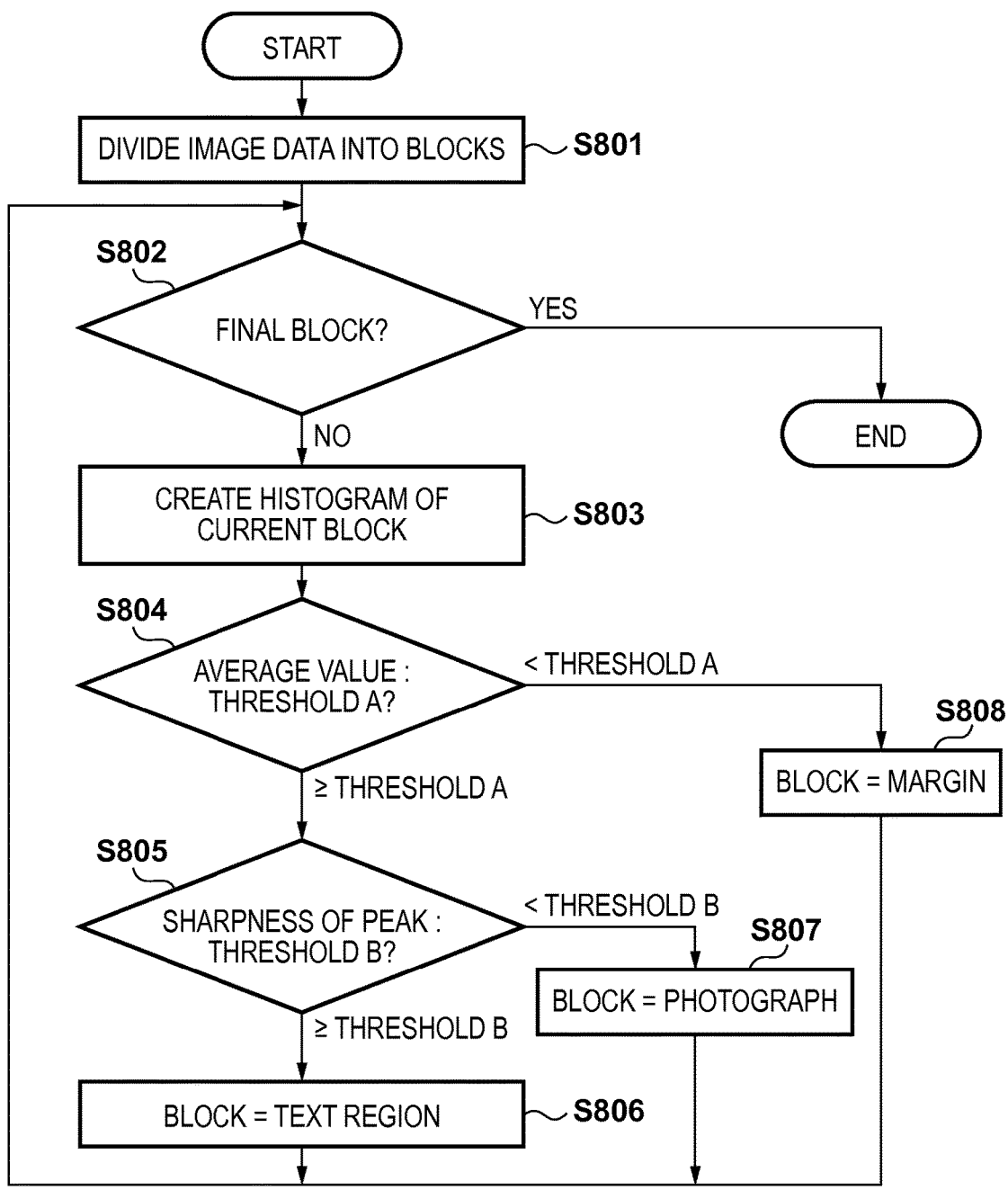
FIG. 8 is a flowchart showing region segmentation processing.

FIG. 8 is a flowchart showing region segmentation processing. The processing in FIG. 8 is implemented by, for example, reading out and executing a program stored in the memory 102 by the CPU 101. In step S801, the CPU 101 divides image data in a predetermined block unit, and performs processes in steps S802 to S808 on the respective blocks in order. In step S802, the CPU 101 determines whether the current processing target block of interest is a final block in the image data. If the CPU 101 determines that the processing target block is a final block, it ends the processing in FIG. 8. If the CPU 101 determines that the processing target block is not a final block, it advances to step S803.

In step S803, the CPU 101 generates the histogram of pixel values for the processing target block. In step S804, the CPU 101 calculates the average value of pixel values from the histogram, and determines whether the average value is equal to or larger than a threshold A. If the CPU 101 determines that the average value is not equal to or larger than the threshold A (is smaller than the threshold A), it determines in step S808 that the processing target block is a margin region. If the CPU 101 determines that the average value is equal to or larger than the threshold A, it advances to step S805.

In step S805, the CPU 101 calculates the sharpness (kurtosis) of the peak of the histogram distribution, and determines whether the sharpness is equal to or higher than a threshold B. If the CPU 101 determines that the sharpness is equal to or higher than the threshold B, it determines in step S806 that the processing target block is a text region. If the CPU 101 determines that the sharpness is not equal to or higher than the threshold B (is lower than the threshold B), it determines in step S807 that the processing target block is a photograph region. After the determination processes in steps S806 to S808, the CPU 101 repeats the processing from step S802. If the attributes of all blocks have been determined, the CPU 101 stores these determination results in a storage area such as the memory 102.

As another attribute determination method, it is also possible to calculate the variance value and average value of pixel values for each block, and when it is determined that the variance value is smaller than a threshold (for example, a value near 0), determine that the processing target block is a margin region. In this method, when the variance value and average value are larger than respective predetermined thresholds, it may be determined that the processing target block is a photograph region; otherwise, it may be determined that the processing target block is a text region.

It is also possible to further determine whether a block determined as a text region includes a recognizable character, and if it is determined that the block does not include such a character, determine that the block is a line art region. It is also possible to determine whether the block includes a horizontal or vertical line, and if it is determined that the block includes a horizontal or vertical line, determine that the block is a table region.

Figure 9:
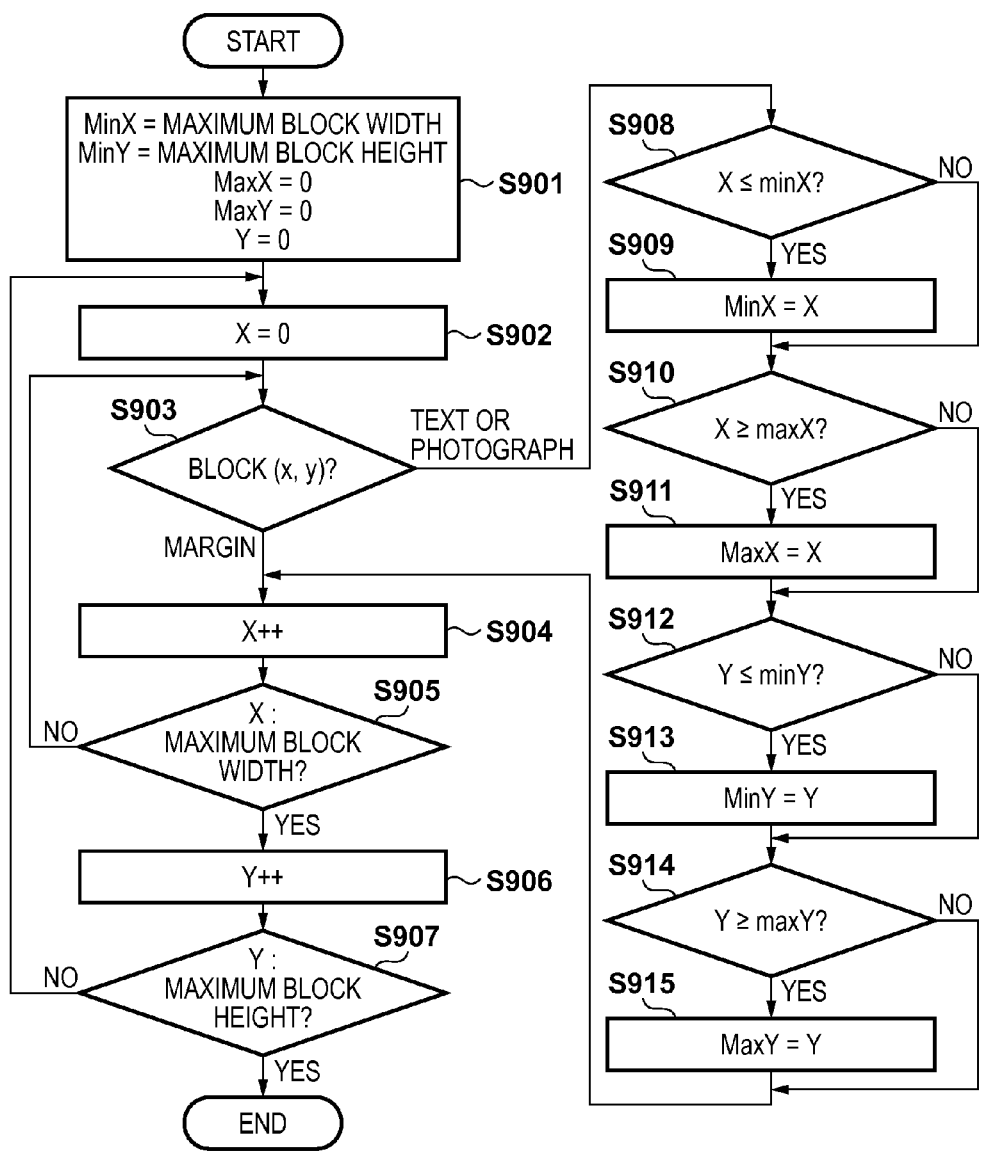
FIG. 9 is a flowchart showing processing of specifying the display target region of a thumbnail image.

FIG. 9 is a flowchart showing processing of specifying the display target region of a thumbnail image according to this embodiment. The processing in FIG. 9 is implemented by, for example, reading out and executing a program stored in the memory 102 by the CPU 101.

Before the processing in FIG. 9, image data is divided into blocks, and attribute determination results are stored in a storage area. The CPU 101 prepares, in a storage area such as the memory 102, variables MinX, MinY, MaxX, MaxY, x, and y used for performing the processing in FIG. 9. In step S901, the CPU 101 sets a maximum block width (12 in the case of FIG. 6) in MinX based on block-divided image data, and a maximum block height (21 in the case of FIG. 6) in MinY. In addition, the CPU 101 sets 0 in MaxX and MaxY, and y.

In step S902, the CPU 101 sets 0 in x. In step S903, the CPU 101 determines which of a text region, photograph region, and margin region is indicated by the attribute of the block (x, y). If the CPU 101 determines that the attribute indicates a text region or a photograph region, it advances to step S908. If the CPU 101 determines that the attribute indicates a margin region, it advances to step S904. In step S904, the CPU 101 increments x by one. In step S905, the CPU 101 determines whether the current x is the maximum block width. If the CPU 101 determines that the current x is the maximum block width, it advances to step S906. If the CPU 101 determines that the current x is not the maximum block width, it repeats the processing from step S903. In step S906, the CPU 101 increments y by one. In step S907, the CPU 101 determines whether the current y is the maximum block height. If the CPU 101 determines that the current y is the maximum block height, it ends the processing in FIG. 9. If the CPU 101 determines that the current y is not the maximum block height, it repeats the processing from step S902.

In step S908, the CPU 101 determines whether the variable x is equal to or smaller than MinX. If the CPU 101 determines that the variable x is equal to or smaller than MinX, it substitutes the variable x into MinX in step S909, and advances to step S910. If the CPU 101 determines that the variable x is larger than MinX, it advances to step S910.

In step S910, the CPU 101 determines whether the variable x is equal to or larger than MaxX. If the CPU 101 determines that the variable x is equal to or larger than MaxX, it substitutes the variable x into MaxX in step S911, and advances to step S912. If the CPU 101 determines that the variable x is smaller than MaxX, it advances to step S912.

In step S912, the CPU 101 determines whether the variable y is equal to or smaller than MinY. If the CPU 101 determines that the variable y is equal to or smaller than MinY, it substitutes the variable y into MinY in step S913, and advances to step S914. If the CPU 101 determines that the variable y is larger than MinY, it advances to step S914.

In step S914, the CPU 101 determines whether the variable y is equal to or larger than MaxY. If the CPU 101 determines that the variable y is equal to or larger than MaxY, it substitutes the variable y into MaxY in step S915, and returns to step S904. If the CPU 101 determines that the variable y is smaller than MaxY, it advances to step S904.

More specifically, if the block is a text region or a photograph region, determination results in steps S908 and S912 for second and subsequent times regarding MinX and MinY are always negative, and determination results in steps S910 and S914 for second and subsequent times regarding MaxX and MaxY are always affirmative. As a result, MinX, MaxX, MinY, and MaxY are obtained after the processing in FIG. 9. Then, a rectangular region having vertices at four coordinate points (MinX, MinY), (MinX, MaxY), (MaxX, MinY), and (MaxX, MaxY) is obtained as a display target region serving as a thumbnail image. FIG. 10 is a view showing a thumbnail image displayed based on thumbnail image data obtained by the processing in FIG. 9. As shown in FIG. 10, a minimum rectangular region 1001 containing a text region and a photograph region so that the minimum rectangular region 1001 circumscribes them is displayed as a thumbnail image 1002. Since a blank region other than the display target region is deleted, compared to FIG. 5, the identifiability of the thumbnail image can be improved.

In the first embodiment, regions effective as a thumbnail image are a text region and a photograph region. However, the effective region may be switched by the user setting. For example, it is also possible that, when an instruction to target only a photograph region is accepted, a margin region and a text region are set as ineffective regions, only a photograph region is set as a target in step S903, and a display target region serving as a thumbnail image is set.

Second Embodiment

Figure 11:
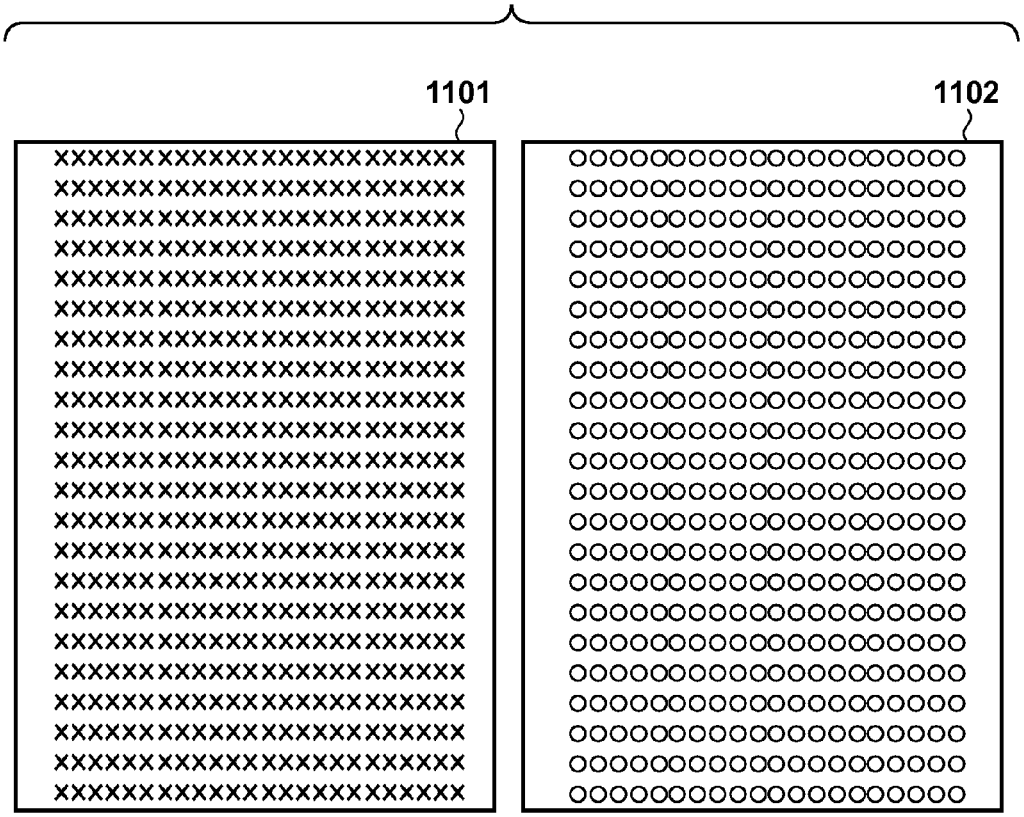
FIG. 11 is a view showing an image having no photograph region.

The second embodiment will explain a case in which as a result of performing region segmentation processing on image data, the image data is constituted by only a text region and a margin region without a photograph region, as represented by image data 1101 and 1102 in FIG. 11, or a photograph region is smaller than a predetermined size.

In this embodiment, a partial region of the text region of the image data 1101 is set as a thumbnail image 1202, as represented by a region 1201 in FIG. 12. A thumbnail image 1203 is a thumbnail image for the image data 1102. As shown in FIG. 12, this embodiment makes it easy to determine the text, rather than forming a thumbnail image from the entire image data 1101 or 1102, and can improve the identifiability of the thumbnail image.

A display target region serving as a thumbnail image may be a predetermined region from a position (the upper left end of an English text or a horizontal Japanese text) corresponding to the start of a document. Alternatively, the user may be allowed to select the vicinity of the center of the image data 1101 or 1102. The size of the region 1201 may be determined based on a predetermined ratio (for example, 1/n of the entire image data) at which a text can be identified. Also, the region size may be determined to have the same ratio as the aspect ratio of a thumbnail image. The method shown in FIGS. 7A to 7C can be used as a method of discriminating a text region from a margin region and a photograph region. This method enables determining that a photograph region is not included in an image or is small, or a text region is included.

Third Embodiment

In the first embodiment, a display target region serving as a thumbnail image is obtained for each block. In the third embodiment, blocks having the same attribute are combined into a block group, and a display target region serving as a thumbnail image is obtained for each block group.

Figure 13A:
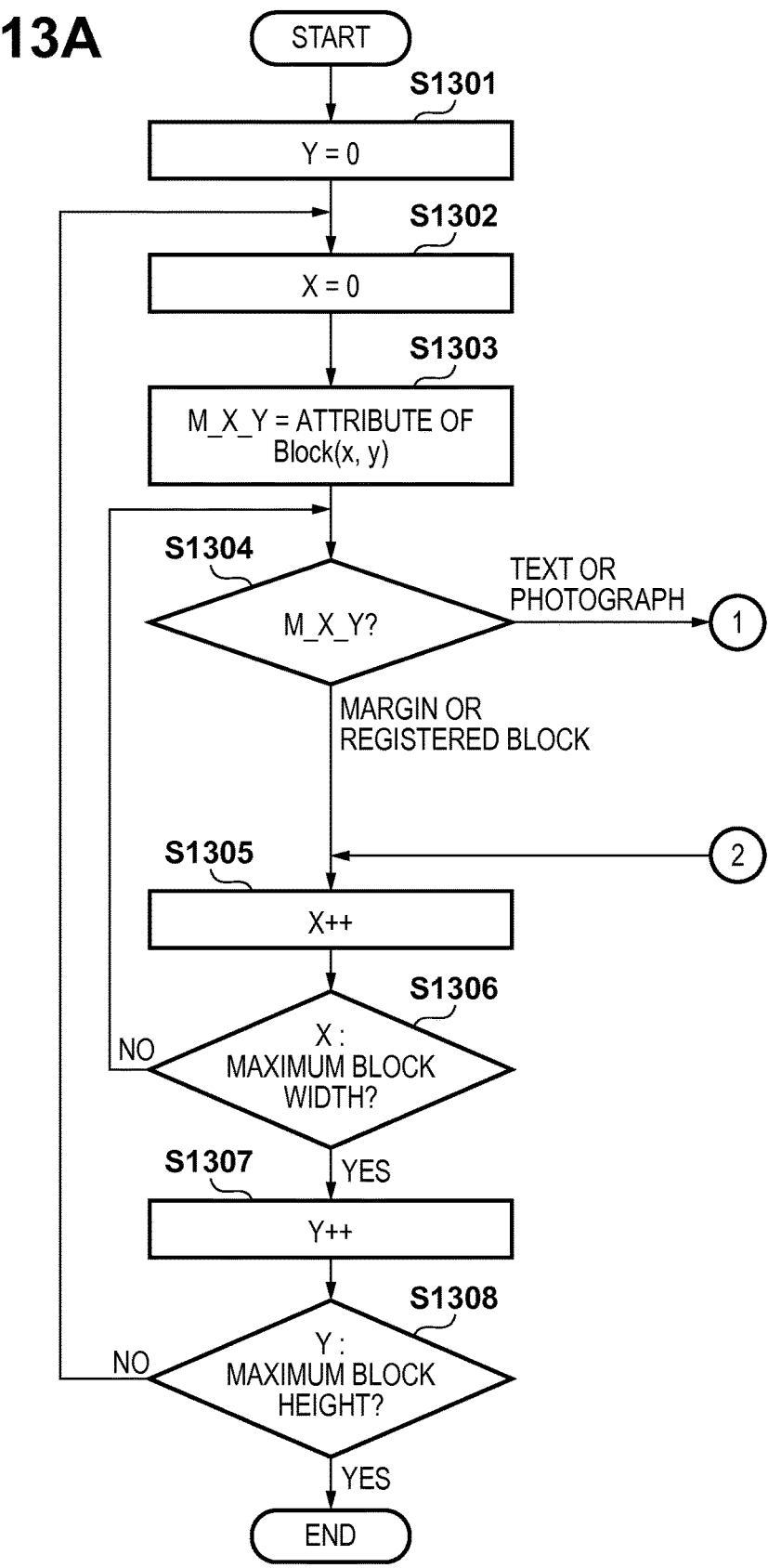
FIGS. 13A and 13B are flowcharts showing processing of generating a block group.
Figure 13B:
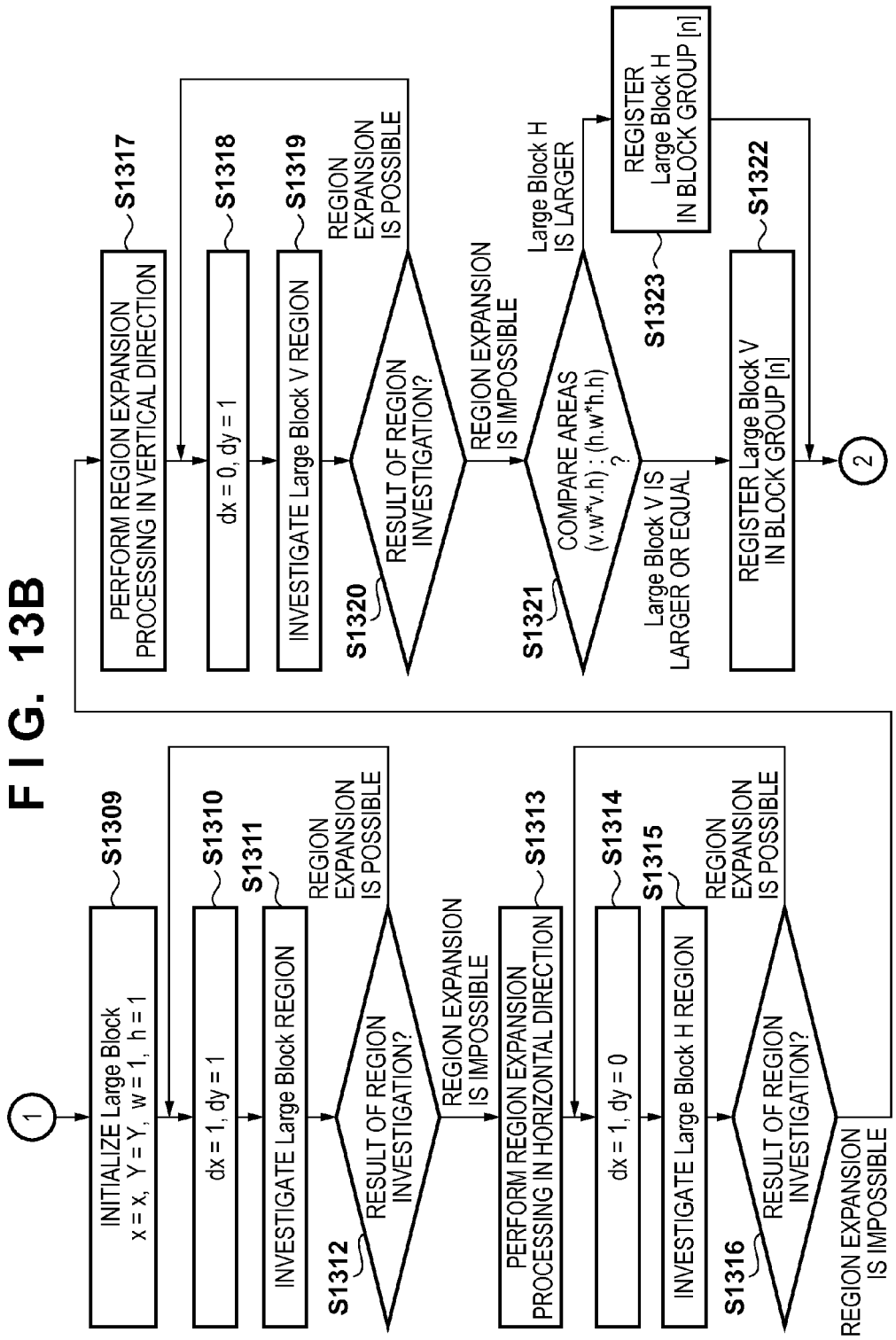

FIG. 13A and FIG. 13B are flowcharts showing processing of generating a block group according to this embodiment. The processing in FIGS. 13A and 13B are implemented by, for example, reading out and executing a program stored in a memory 102 by a CPU 101. Before the processing in FIGS. 13A and 13B, image data is divided into blocks, and attribute determination results are stored in a storage area. The CPU 101 prepares, in a storage area such as the memory 102, variables x, y, w, and h used for performing the processing in FIGS. 13A and 13B.

The CPU 101 sets 0 in the variable y in step S1301, and 0 in the variable x in step S1302. (x, y) set in steps S1301 and S1302 will be called an origin. In step S1303, the CPU 101 acquires the attribute of the block (x, y). In step S1304, the CPU 101 determines which of a text region, a photograph region, a margin region, or a block included in a block group already registered (having undergone processing in step S1322 or S1323) is indicated by the acquired attribute. If the CPU 101 determines that the margin region is a block included in the already registered block group, it advances to step S1305. If the CPU 101 determines that the margin region is a text region or a photograph region, it advances to step S1309.

The CPU 101 increments the current x by one in step S1305, and advances to step S1306. In step S1306, the CPU 101 determines whether the current x is a maximum block width. If the CPU 101 determines that the current x is a maximum block width, it advances to step S1307. If the CPU 101 determines that the current x is not a maximum block width, it repeats the processing from step S1304. In step S1307, the CPU 101 increments the current y by one. In step S1308, the CPU 101 determines whether the current y is a maximum block height. If the CPU 101 determines that the current y is a maximum block height, it ends the processing in FIGS. 13A and 13B. If the CPU 101 determines that the current y is not a maximum block height, it repeats the processing from step S1302. The maximum block width and the maximum block height are equal to those in the first embodiment.

In step S1309, the CPU 101 sets 1 in the variables w and h, and defines a large block. The variable w is a block count indicating the width of a block group (large block) in the horizontal direction, and the variable h is a block count indicating the height of a block group (large block) in the vertical direction. In step S1310, the CPU 101 increments the variables x and y by one. That is, the large block defined in step S1309 is widened by one block in each of the horizontal and vertical directions.

In step S1311, the CPU 101 investigates the region of the large block of the current processing target. As the region investigation, the attribute of each block in the large block is acquired. In step S1312, the CPU 101 determines whether all blocks in the large block are text regions, photograph regions, or neither of them as a result of the region investigation. If the CPU 101 determines that all blocks are text regions or photograph regions, it determines that region expansion is possible, and repeats the processing from step S1310. If the CPU 101 determines that not all blocks are text regions or photograph regions, the CPU 101 determines that region expansion is impossible, and advances to step S1313. More specifically, steps S1309 to S1312 aim to obtain a maximum block group (to be referred to as a reference large block hereinafter) in which all internal blocks are text regions or photograph regions, while widening the large block in the horizontal and vertical directions.

In step S1313, the CPU 101 starts region expansion processing on the obtained reference large block in the horizontal direction. In step S1314, the CPU 101 increments only the variable x by one. That is, the reference large block is widened in the horizontal direction. In step S1315, the CPU 101 investigates the region of the large block of the current processing target. As the region investigation, the attribute of each block in the large block is acquired. In step S1316, the CPU 101 determines whether all blocks in the large block are text regions, photograph regions, or neither of them as a result of the region investigation. If the CPU 101 determines that all blocks are text regions or photograph regions, it determines that region expansion is possible, and repeats the processing from step S1314. If the CPU 101 determines that not all blocks are text regions or photograph regions, the CPU 101 determines that region expansion is impossible, and advances to step S1317. More specifically, steps S1313 to S1316 aim to obtain a maximum block group (to be referred to as a large block H hereinafter) in which all internal blocks are text regions or photograph regions, while widening the reference large block in the horizontal direction.

In step S1317, the CPU 101 starts region expansion processing on the reference large block in the vertical direction. In step S1318, the CPU 101 increments only the variable y by one. That is, the reference large block is widened in the vertical direction. In step S1319, the CPU 101 investigates the region of the large block of the current processing target. As the region investigation, the attribute of each block in the large block is acquired. In step S1320, the CPU 101 determines whether all blocks in the large block are text regions, photograph regions, or neither of them as a result of the region investigation. If the CPU 101 determines that all blocks are text regions or photograph regions, it determines that region expansion is possible, and repeats the processing from step S1318. If the CPU 101 determines that not all blocks are text regions or photograph regions, the CPU 101 determines that region expansion is impossible, and advances to step S1321. More specifically, steps S1317 to S1320 aim to obtain a maximum block group (to be referred to as a large block V hereinafter) in which all internal blocks are text regions or photograph regions, while widening the reference large block in the vertical direction.

In step S1321, the CPU 101 compares the sizes of the large blocks H and V. If the CPU 101 determines that the size of the large block V is larger or these sizes are equal, it advances to step S1322. In step S1322, the CPU 101 registers the large block V as a candidate block group of a display target region serving as a thumbnail image. If the CPU 101 determines that size of the large block H is larger, it advances to step S1323. In step S1323, the CPU 101 registers the large block H as a candidate block group of a display target region serving as a thumbnail image.

After the processing in step S1322 or S1323, the CPU 101 advances to step S1305 based on x and y of the origin. If the processing in FIGS. 13A and 13B are performed until y reaches the maximum block height, a plurality of block groups each of blocks having the same attribute are created in the image data.

In FIGS. 13A and 13B, whether all blocks in a large block are text regions, photograph regions, or neither of them are determined in each of the determination processes of steps S1312, S1316, and S1320. If the ratio of the number of blocks having a predetermined attribute (text region or photograph region) is equal to or higher than a predetermined threshold as for an increase in blocks when increasing the size, processing may be performed to further increase the size, as shown in FIG. 14.

FIG. 14 is a flowchart showing processing of widening the region of a large block. In step S1401, the CPU 101 acquires the number A of blocks having a predetermined attribute in the large block of the current processing target. Here, the large block of the current processing target is, for example, a block having a size including (x, y) and (x+w, y+h) as coordinate points on a diagonal line.

In step S1402, the CPU 101 acquires the number B of blocks having a predetermined attribute in a block having a size including (x, y) and (x+w+dx, y+h+dy) as coordinate points on a diagonal line. For example, in step S1310, both dx and dy are 1. In step S1314, dx is 1 and dy is 0. In step S1318, dx is 0 and dy is 1.

In step S1403, the CPU 101 obtains a difference C between B and A. In step S1404, the CPU 101 obtains, from (w+dx)×(h+dy)−w×h, the number D of blocks added when increasing the size. In step S1405, the CPU 101 obtains a ratio R(C/D) of C obtained in step S1403 to D obtained in step S1404.

In step S1406, the CPU 101 determines whether R is equal to or higher than a predetermined threshold, or lower than the threshold. If the CPU 101 determines that R is equal to or higher than the threshold, it increases the size of the large block by dx and dy in step S1407. The processing in step S1407 corresponds to a case in which it is determined in each of the processes of steps S1312, S1316, and S1320 of FIGS. 13A and 13B that region expansion is possible. After the processing in step S1407, the CPU 101 repeats the processing from step S1401. If the CPU 101 determines in step S1406 that R is lower than the threshold, it ends the processing in FIG. 14. This corresponds to a case in which it is determined in each of the processes of steps S1312, S1316, and S1320 of FIG. 13B that region expansion is impossible.

Figure 15:
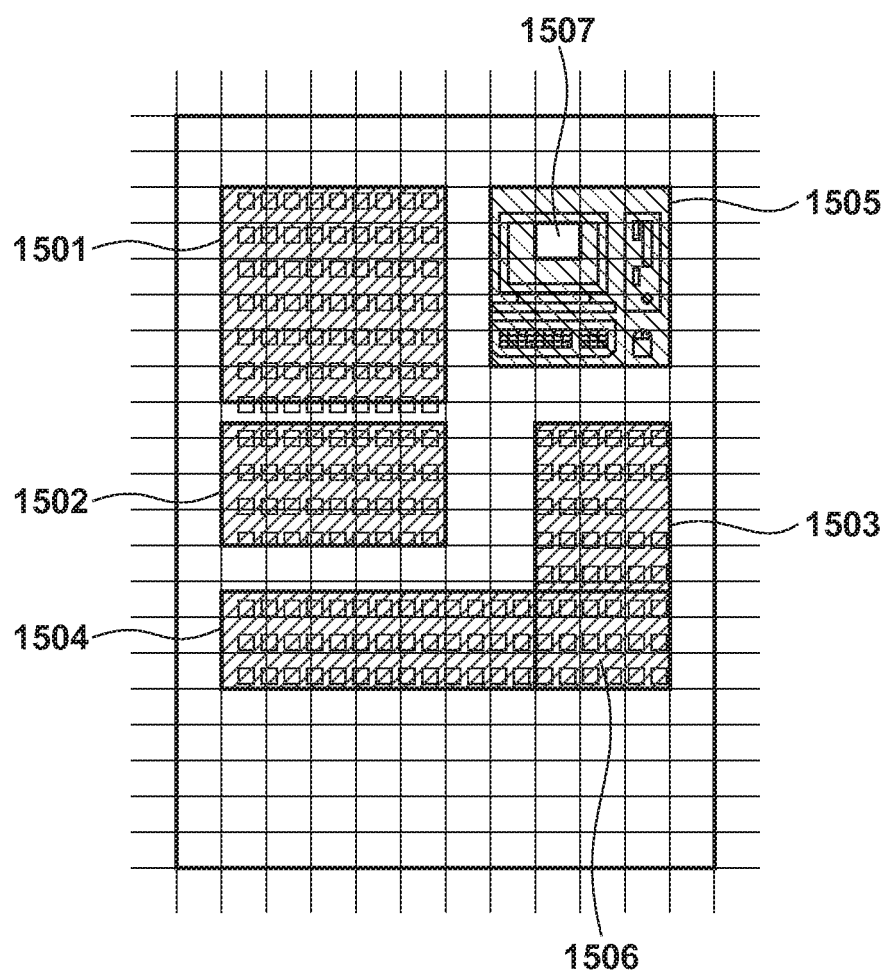
FIG. 15 is a view showing generated block groups.

In this embodiment, a plurality of block groups exist in image data after the processing in FIGS. 13A and 13B. FIG. 15 is a view showing an example of generated block groups after the processing in FIGS. 13A and 13B. As shown in FIG. 15, block groups 1501 to 1504 of text regions and a block group 1505 of a photograph region are generated. When a line feed, space, or the like exists in a text, block groups of a plurality of text regions are generated as shown in FIG. 15. In the case of processing of moving the origin of a processing target from the upper left corner in the horizontal direction, as in FIGS. 13A and 13B, there is sometimes an overlapping region 1506 in which the block groups 1503 and 1504 partially overlap each other. In this embodiment, overlapping regions are deleted between a plurality of generated block groups by processing in FIG. 16.

Figure 16:
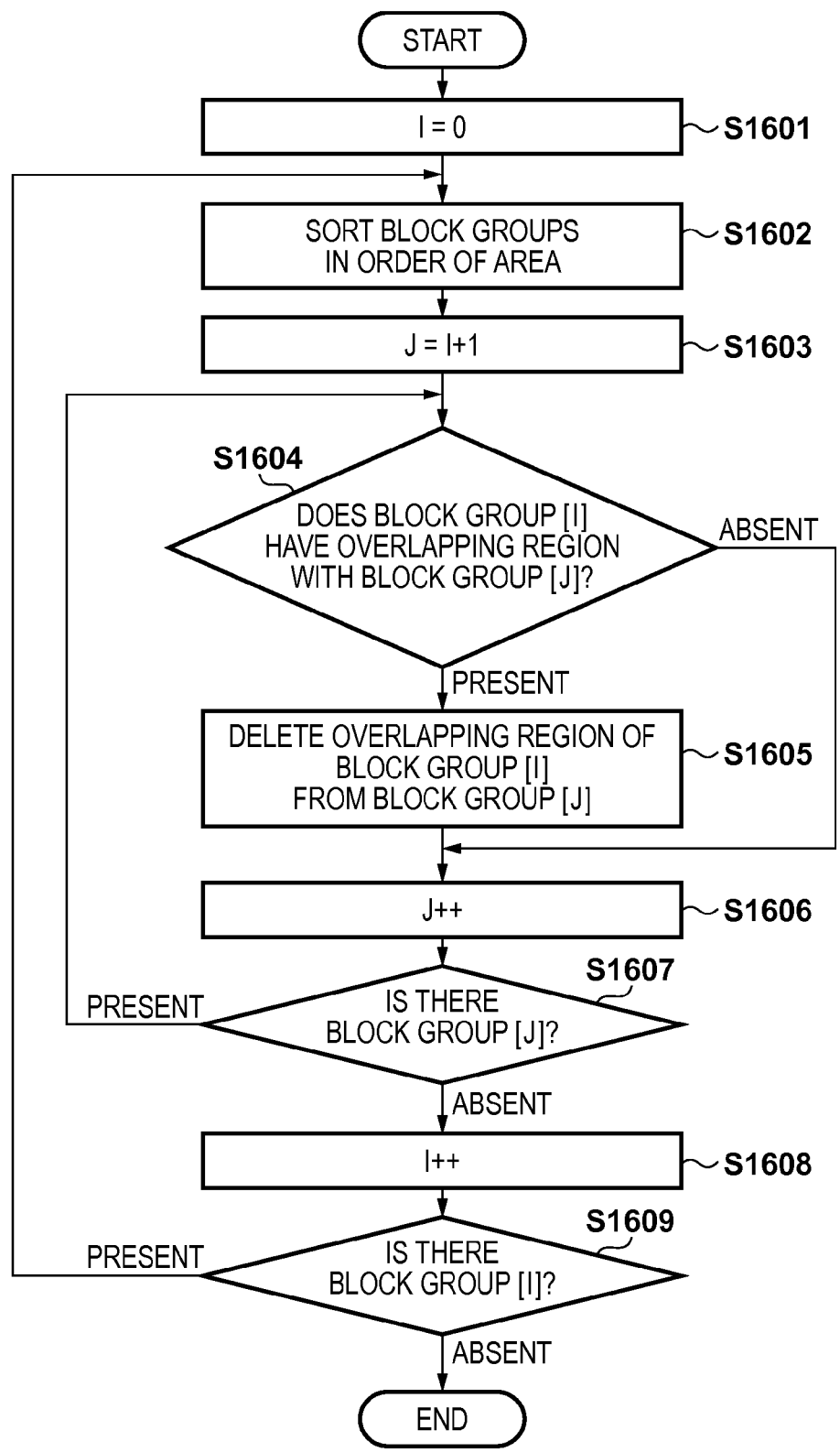
FIG. 16 is a flowchart showing processing of deleting an overlapping region between block groups.

FIG. 16 is a flowchart showing processing of deleting overlapping regions from a plurality of block groups sequentially in descending order of the block size. In step S1601, the CPU 101 ensures a variable i in the storage area and sets 0. In step S1602, the CPU 101 sorts a plurality of generated block groups in descending order of the size. At this time, the block groups are ranked as 0, 1, 2, . . . sequentially in descending order of the size. In step S1603, the CPU 101 ensures a variable j in the storage area and sets, in j, a value obtained by incrementing the variable i by one.

In step S1604, the CPU 101 determines whether there is an overlapping region between a block group of a rank i (for example, 0) and a block group of a rank j (for example, 1). If the CPU 101 determines that there is an overlapping region, it advances to step S1605. If the CPU 101 determines that there is no overlapping region, it advances to step S1606. In step S1605, the CPU 101 deletes the overlapping region from the block group of the rank j (1), and advances to step S1606. In step S1606, the CPU 101 increments the variable j by one.

In step S1607, the CPU 101 determines whether the block group of the rank j exists in the plurality of block groups generated in the image data. If the CPU 101 determines that the block group of the rank j exists, it repeats the processing from step S1604. If the CPU 101 determines that the block group of the rank j does not exist, it increments the variable i by one in step S1608.

In step S1609, the CPU 101 determines whether the block group of the rank i exists in the plurality of block groups generated in the image data. If the CPU 101 determines that the block group of the rank i exists, it repeats the processing from step S1602. If the CPU 101 determines that the block group of the rank i does not exist, it ends the processing in FIG. 16.

More specifically, in the processing of FIG. 16, a block group of a large size and a block group of a small size are sequentially compared, and if there is an overlapping region, the overlapping region is deleted from the block group of the small size. After the processing in FIG. 16 is performed, the overlapping region 1506 is deleted from the block group 1503 in FIG. 15.

When expansion of a large block is performed by the processing in FIG. 14, the block group 1505 of the photograph region sometimes includes a block 1507 of a margin region, as shown in FIG. 15. In such a case, the attribute of the block 1507 may be changed into the attribute of the block group 1505 so that the block 1507 can be processed as part of the block group 1505. In this case, the ratio in size between the block 1507 and the block group 1505 around the block 1507 may be obtained, and if the ratio is equal to or lower than a predetermined threshold, the block 1507 may be processable as part of the block group 1505.

Figure 17:
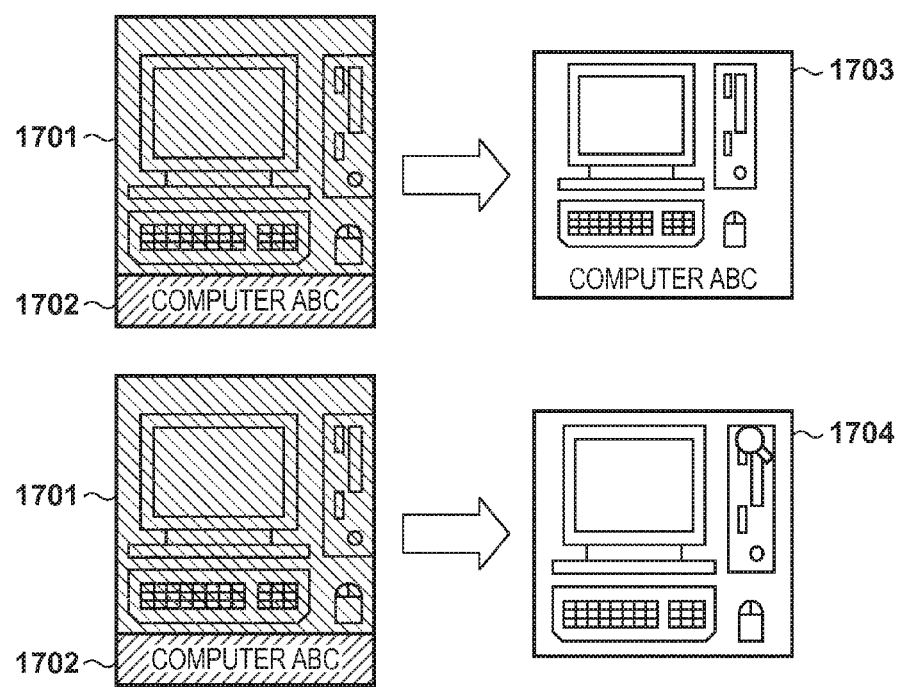
FIG. 17 is a view showing a thumbnail image displayed based on a block group.

In this embodiment, for example, a block group 1701 of a photograph region and a block group 1702 of a text region in FIG. 17 are generated. In the first embodiment, a thumbnail image 1703 including both the block groups 1701 and 1702 is displayed. To the contrary, in the third embodiment, only the block group 1701 can be displayed as a thumbnail image 1704.

In this embodiment, when a plurality of block groups are generated, a block group to be displayed as a thumbnail image may be determined based on designation by the user. For example, when an instruction to give priority to a photograph is accepted from the user, the ratio of the block group 1702 of the text region to the entire image data and the ratio of the block group 1701 of the photograph region to the entire image data are obtained. If the ratio of the block group 1702 of the text region to the entire image data is lower than a predetermined threshold, and the ratio of the block group 1701 of the photograph region to the entire image data is higher than a predetermined threshold, the thumbnail image 1704 may be generated.

Alternatively, when an instruction to display a thumbnail image using a maximum block group in image data including the block group 1701 of the photograph region and the block group 1702 of the text region is accepted from the user, the thumbnail image 1704 may be generated. Alternatively, block groups of a specific size or smaller may be excluded from the generation target of a thumbnail image. Further, even when it is determined that the block group 1702 is excluded from the generation target of the thumbnail image, if the block group 1702 is determined to be a text region representing necessary caption information accessory to a photograph region, the block group 1702 may be set as the generation target of a thumbnail image.

Fourth Embodiment

Figure 18:
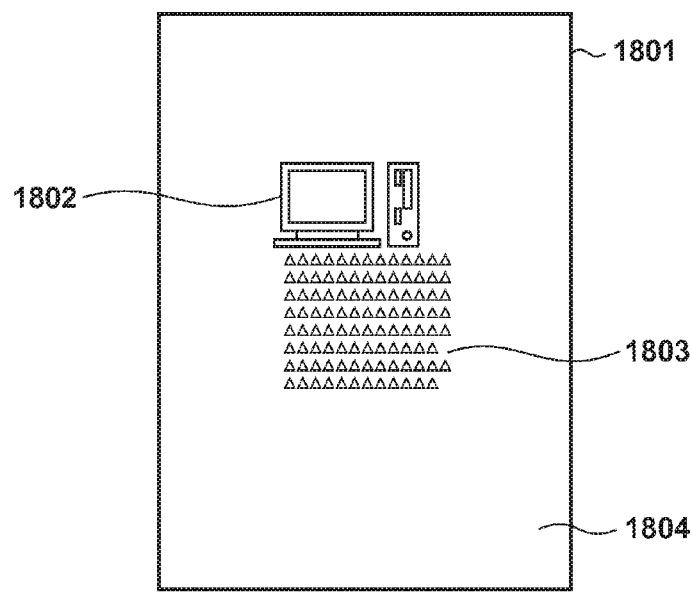
FIG. 18 is a view showing each attribute region included in image data.
Figure 19:
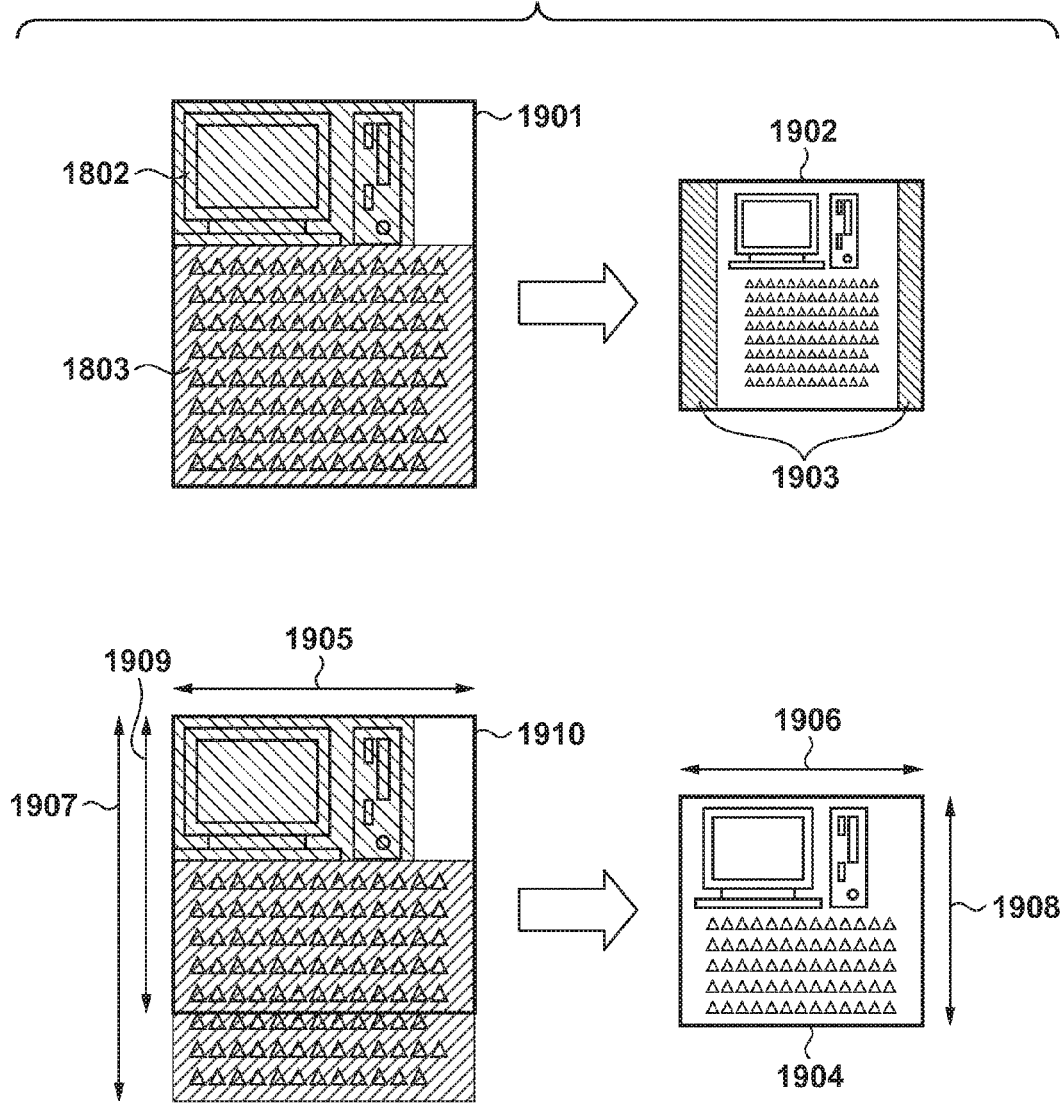
FIG. 19 is a view showing the display target region of a thumbnail image.

As shown in FIG. 18, image data 1801 is constituted by three types of regions: a photograph region 1802, a text region 1803, and a margin region 1804. When the processing according to the first embodiment is executed on the image data 1801, a thumbnail image 1902 is generated from a region 1901 including the photograph region 1802 and the text region 1803, as shown in FIG. 19. Since the aspect ratio of the thumbnail image 1902 is different from that of the region 1901 where a thumbnail image is displayed, regions 1903 having no image are generated in the thumbnail image 1902. In the fourth embodiment, a thumbnail image 1904 is generated by deleting the regions 1903 having no image so as to prevent degradation of the identifiability.

First, the CPU 101 obtains a ratio A between a width 1905 of the region 1901 and a width 1906 of the thumbnail image 1904. Then, the CPU 101 obtains a ratio B between a height 1907 of the region 1901 and a height 1908 of the thumbnail image 1904. The CPU 101 specifies a lower one of the ratios A and B. For example, in FIG. 19, the ratio A is lower and thus specified.

Subsequent processing will be explained with reference to FIG. 19. A height 1909 of the region 1901 with respect to the height 1908 of the thumbnail image 1904 is so obtained as to have the specified ratio A. The CPU 101 determines whether partial deletion is possible for a region overlapping the boundary of a region 1910 defined by the height 1909 and the width 1905. For example, when the boundary of the region 1910 cuts off the text region 1803, this does not pose a problem in the identifiability of a thumbnail image, and it is determined that partial deletion is possible. In contrast, when the boundary of the region 1910 cuts off the photograph region 1802, this influences the identifiability of a thumbnail image, and it is determined that partial deletion is impossible. If the CPU 101 determines that partial deletion is possible, it partially deletes the text region 1803 in accordance with the region 1910, generating the thumbnail image 1904.

Fifth Embodiment

Figure 20A:
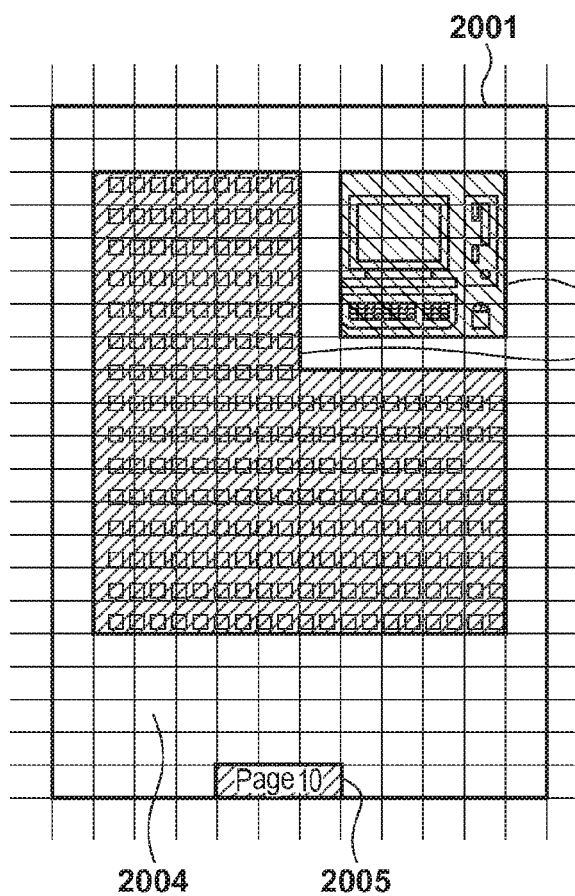
FIGS. 20A to 20C are views showing image data including a footer region.

As shown in FIG. 20A, image data 2001 is constituted by a photograph region 2002, a text region 2003, a margin region 2004, and a region 2005. The region 2005 is a footer including page information. So-called header/footer caption information is generally positioned at the top or bottom of a page, and cut off from the body by the margin region 2004. This caption information has a feature in which the caption information is a relatively small text region. In some cases, page information is less important than the body. In this embodiment, therefore, the page information is set as a region out of the generation target of a thumbnail image.

More specifically, when a text region exists near the upper or lower end of an image, like the region 2005 of FIG. 20A, an effective region 2006 corresponding to the region 2005 in the thumbnail image is compared with a margin region 2007 in the thumbnail image. If the ratio of the effective region 2006 to the margin region 2007 is lower than a predetermined threshold, the region 2005 is determined as a footer region and excluded from the generation target of a thumbnail image.

Figure 20B:
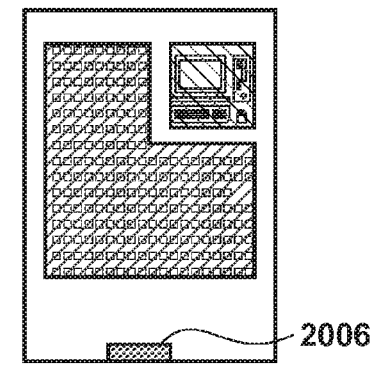
Figure 20C:
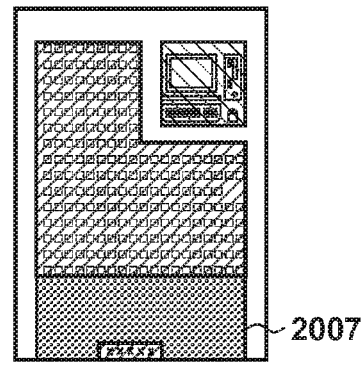
Figure 21A:
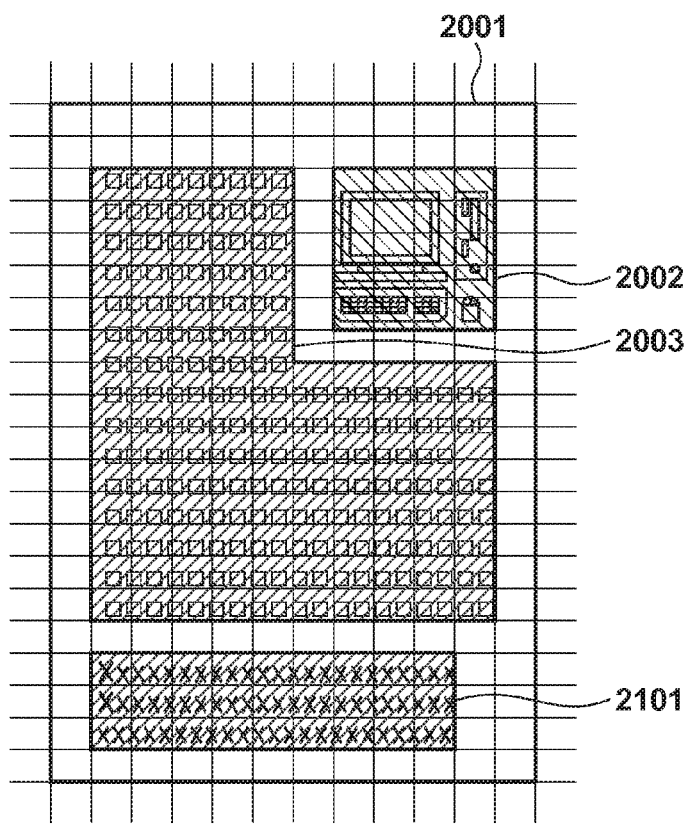
FIGS. 21A to 21C are views showing image data including no footer region.
Figure 21B:
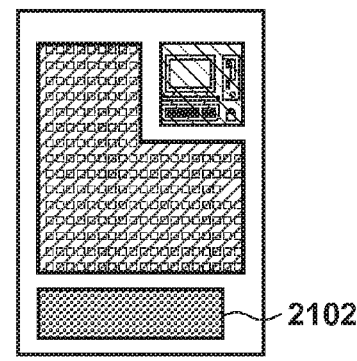
Figure 21C:
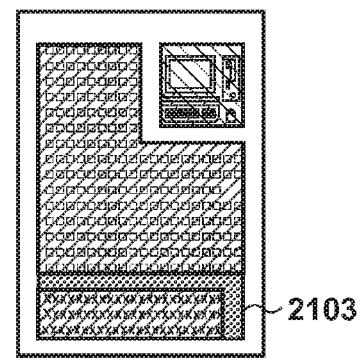

Assume that a text region exists near the lower end of an image, like a region 2101 shown in FIG. 21A. In this case, the ratio of an effective region 2102 to a margin region 2103 in the thumbnail image becomes higher than that in FIGS. 20A to 20C. For example, when it is determined that the ratio is equal to or higher than a predetermined threshold, the region 2101 is determined not as a footer region but as a text region, and set as the generation target of a thumbnail image.

Figure 22:
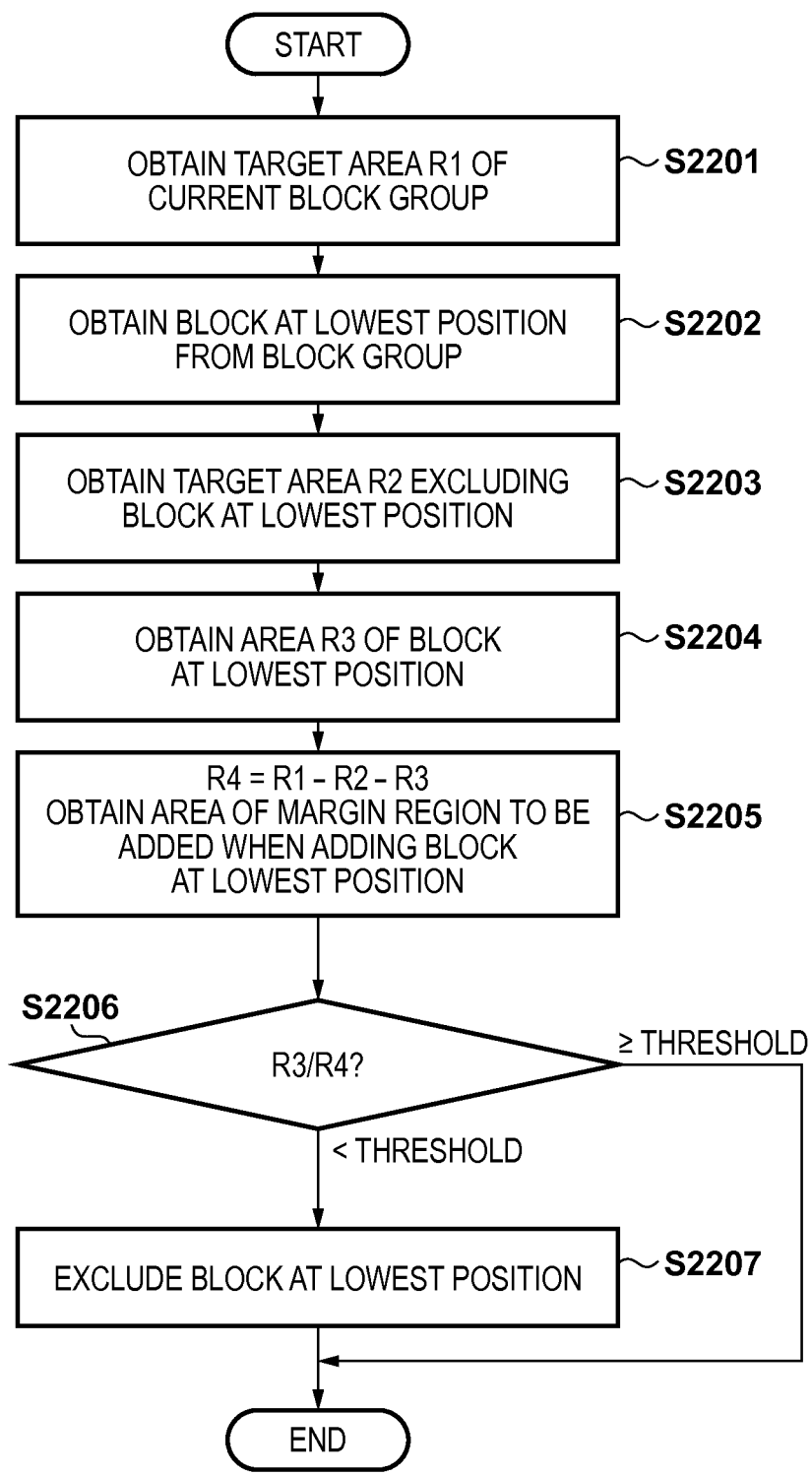
FIG. 22 is a flowchart showing processing of specifying the display target region of a thumbnail image.

FIG. 22 is a flowchart showing processing of specifying the display target region of a thumbnail image according to this embodiment. The processing in FIG. 22 is implemented by, for example, reading out and executing a program stored in a memory 102 by a CPU 101. Before the processing in FIG. 22, a plurality of block groups are generated and listed in image data by the processing according to the third embodiment. The processing in FIG. 22 makes it possible to determine whether a block group arranged at a lowest position in the image is a footer.

In step S2201, the CPU 101 acquires a display target area R1 when all generated block groups are set as the generation target of a thumbnail image. This corresponds to the display target area of a thumbnail image obtained by the processing according to the first embodiment, or a display target area based on all block groups generated by the processing according to the third embodiment. The display target area includes even a margin region in addition to a text region and a photograph region. In the example of FIGS. 20A to 20C, the area of a minimum rectangle including the regions 2002, 2003, and 2005 is equivalent to R1.

In step S2202, the CPU 101 specifies a block group at a lowest position in the image within the list of block groups. In the example of FIGS. 20A to 20C, the region 2005 is equivalent to this block group. In step S2203, the CPU 101 acquires a display target area R2 when block groups excluding the block group specified in step S2202 are set as the generation target of a thumbnail image. In the example of FIGS. 20A to 20C, the area of the minimum rectangular region including the photograph region 2002 and the text region 2003 is equivalent to the display target area R2.

In step S2204, the CPU 101 acquires an area R3 of the block group specified in step S2202. In the example of FIGS. 20A to 20C, the area of the region 2005 is equivalent to the area R3.

In step S2205, the CPU 101 calculates an area R4 of a margin region that is added in the thumbnail image when the block group specified when the block group specified in step S2202 is added:

$$R4 = R1 - R2 - R3 \tag{1}$$

In the example of FIGS. 20A to 20C, the area R4 is equivalent to the area of the margin region corresponding to the margin region 2007.

In step S2206, the CPU 101 obtains the ratio of R3 acquired in step S2204 to R4 calculated in step S2205, and determines whether the ratio is lower than a predetermined threshold. If the CPU 101 determines that the ratio is lower than the predetermined threshold, it determines in step S2207 that the block group at the lowest position in the list of block groups is a footer region, and excludes the block group from the generation target of a thumbnail image. After the processing in step S2207, the CPU 101 ends the processing in FIG. 22. If the CPU 101 determines that the ratio is not lower than (is equal to or higher than) the predetermined threshold, it ends the processing in FIG. 22.

Note that the footer region determination method has been explained in the above example. However, determination of a header region can also be performed by using, as R3, the area of a block group at a highest position in an image.

As described above, according to the fifth embodiment, a region determined as a header region or a footer region (region that can be excluded from the display target of a thumbnail image) is excluded from the generation target of the thumbnail image. However, for example, when an original constituted by a plurality of pages is scanned separately a plurality of times, the page number is important. For example, when a region is determined as a header region or a footer region by the processing according to this embodiment, it may be determined whether information of the page number is included, and if so, this region may be set as the generation target of a thumbnail image.

Sixth Embodiment

In the display of a thumbnail image according to the first to fifth embodiments, an icon representing partial expansion, like an icon 1204 in FIG. 12, may be arranged on a thumbnail image so as to explicitly indicate that the thumbnail image is not an entire image but a part. It is also possible that an expanded image is superposed on a conventional thumbnail image serving as the background to display the contents of both of them, as shown in FIG. 23.

Figure 23:
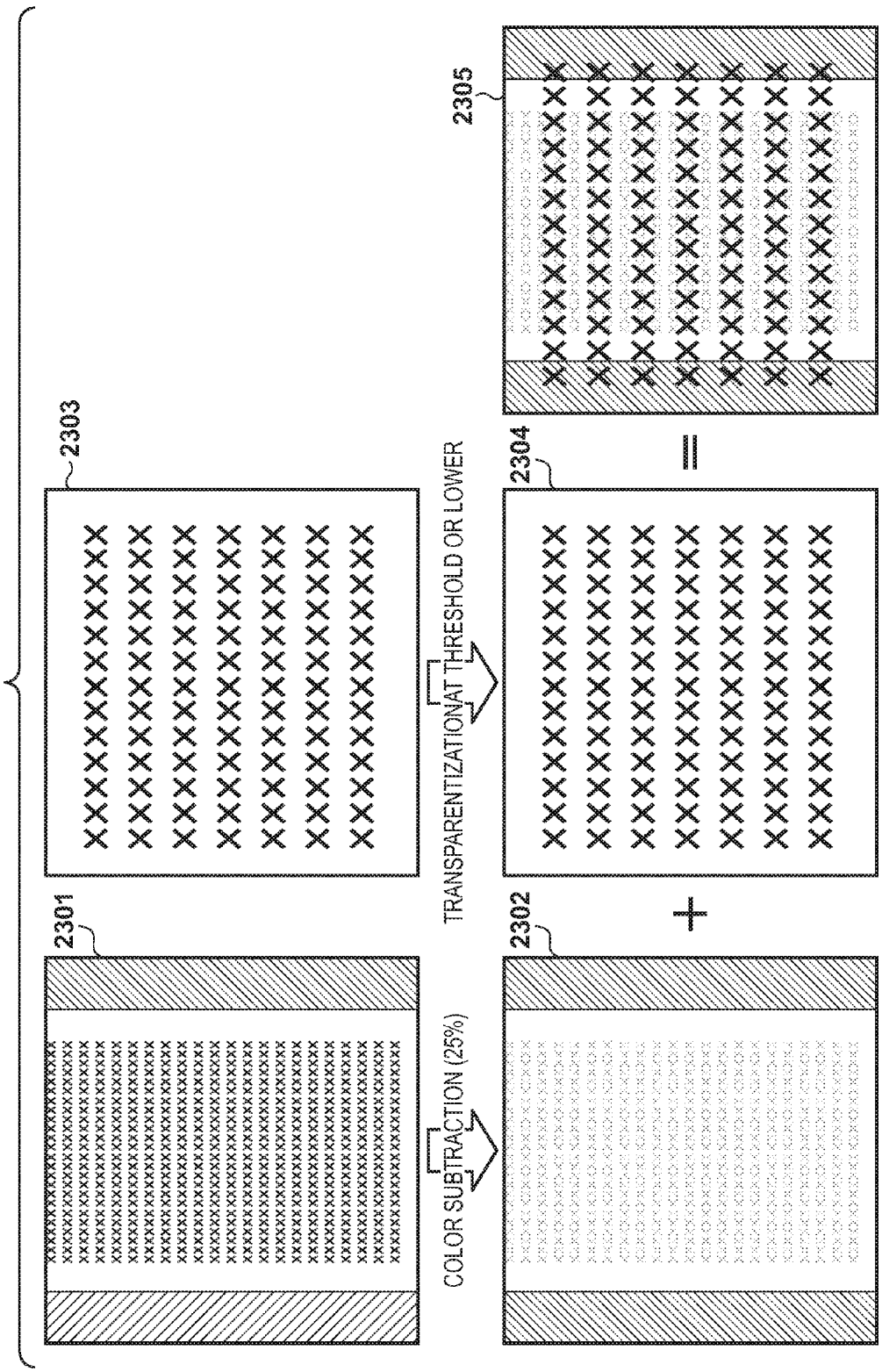
FIG. 23 is a view showing a thumbnail image display form.

As the superposition method, for example, a thumbnail image 2302 is generated by subtracting the color (for example, to 25%) of an image 2301 obtained by performing reduction processing on the entire conventional image data, as shown in FIG. 23. In addition, a thumbnail image 2304 is generated by transparentizing (transmissively processing) a thumbnail image 2303 generated according to one of the first to fifth embodiments to have a density equal to or lower than a threshold, and is superposed on the thumbnail image 2302, thereby generating a composite thumbnail image 2305.

Seventh Embodiment

In the seventh embodiment, one of the first to sixth embodiments is applied to a preview image displayed within an application or a unique selection screen. When a plurality of thumbnail images are displayed within the application, both of a thumbnail image generated in one of the first to sixth embodiments and a thumbnail image obtained by reducing the entire image data are generated so that the display can be switched in accordance with a user instruction.

Figure 24:
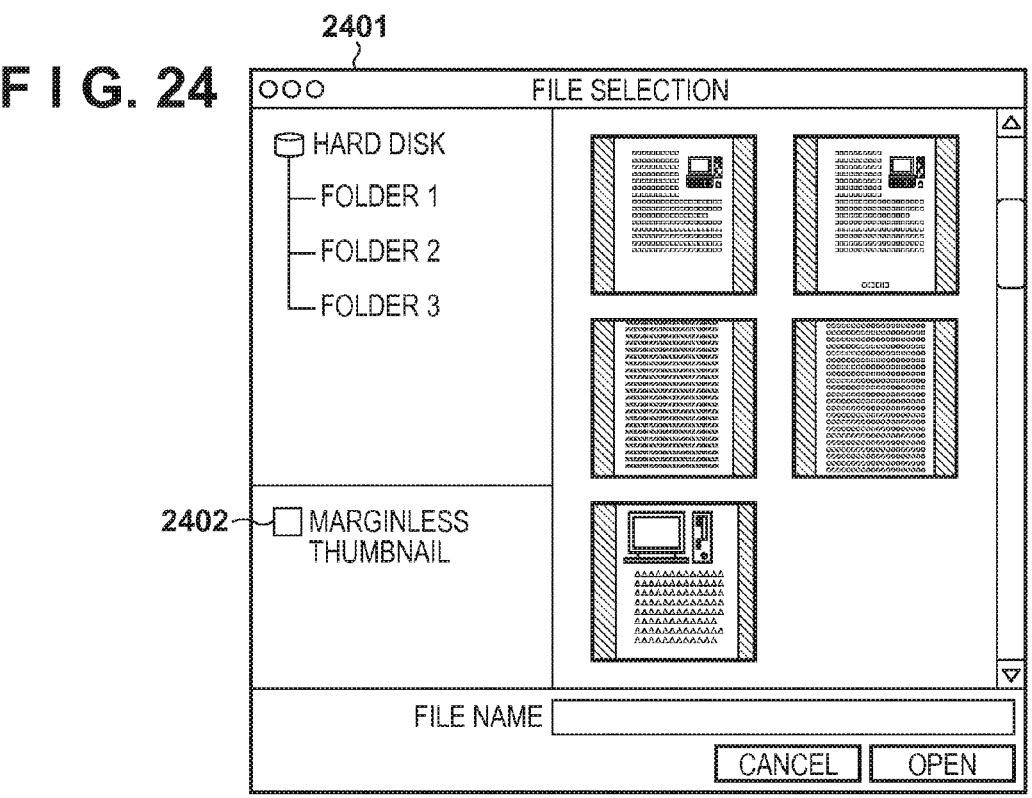
FIG. 24 is a view showing a thumbnail image display screen.
Figure 25:
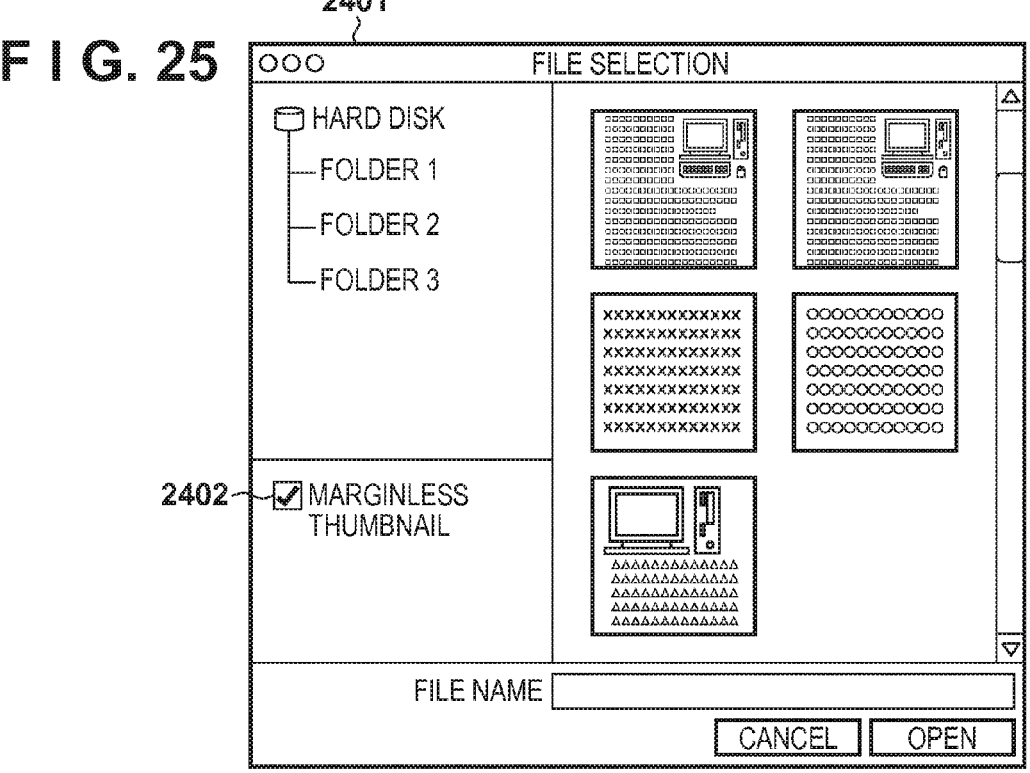
FIG. 25 is a view showing another thumbnail image display screen.

FIGS. 24 and 25 are views showing an example of switching the display of a thumbnail image in an application. FIG. 24 shows a display screen 2401 of a plurality of thumbnail images generated by reducing entire conventional image data. In the application, the user can select a desired thumbnail image from the display screen 2401. In order to execute the display switching in this embodiment, the display screen 2401 has a check box 2402. By enabling the check box 2402, the user can switch the display to display of a thumbnail image generated according to one of the first to sixth embodiments. When the user disables the check box 2402, a thumbnail image representing the entire image is displayed. It is also possible to provide check boxes individually for respective thumbnail images, and switch each thumbnail image between display of the entire image and display of part of the image.

FIG. 25 shows the display screen 2401 of a plurality of thumbnail images when the check box 2402 is enabled. As shown in FIG. 25, the identifiability of each thumbnail image is improved, compared to FIG. 24.

Figure 26:
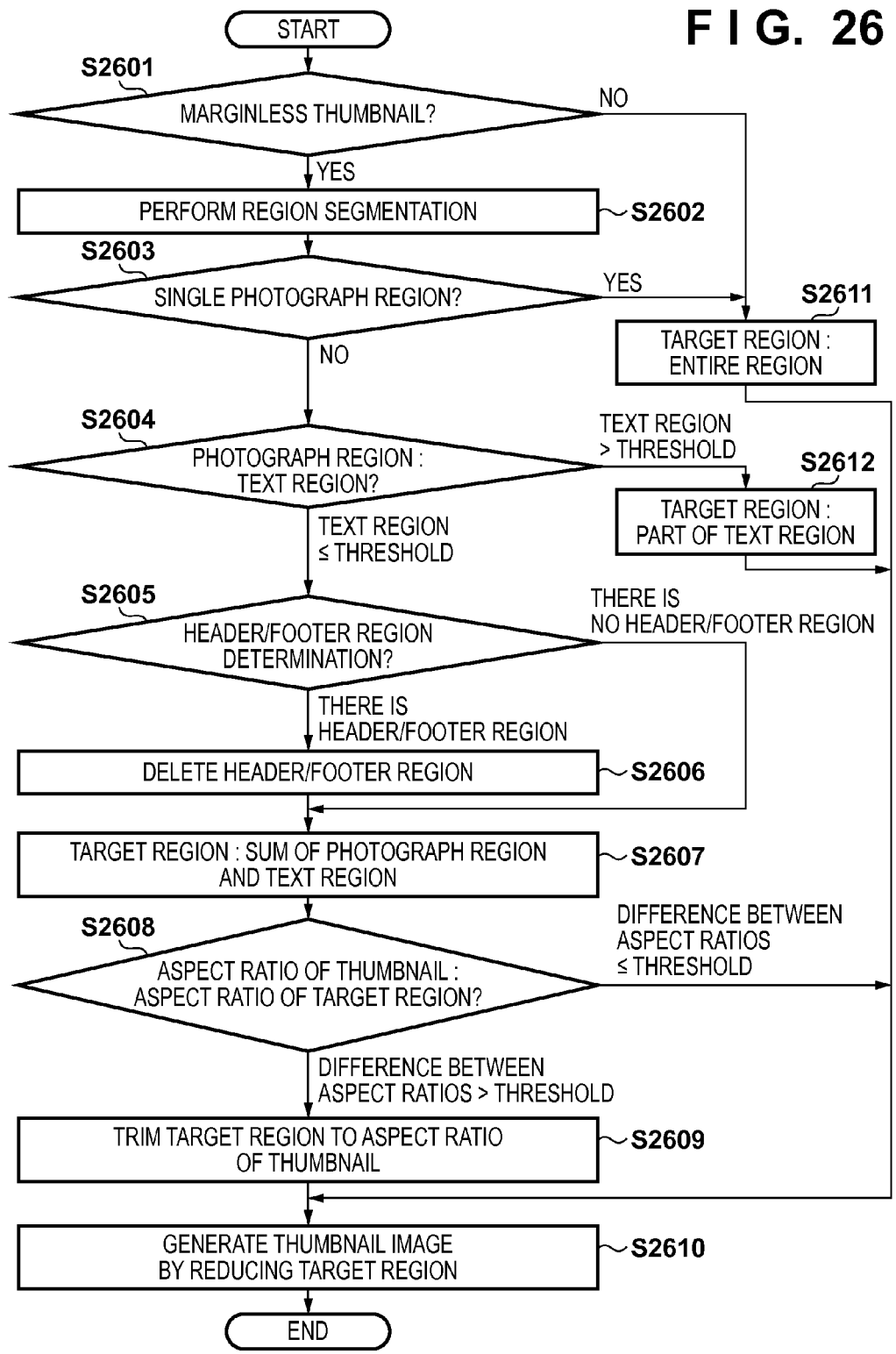
FIG. 26 is a flowchart showing processing of switching the thumbnail image display screen.

FIG. 26 is a flowchart showing thumbnail image display control processing according to this embodiment. The processing in FIG. 26 is implemented by, for example, reading out and executing a program stored in a memory 102 by a CPU 101. In step S2601, the CPU 101 determines whether the check box 2402 has been enabled. If the CPU 101 determines that the check box 2402 has been enabled, the process advances to step S2602. If the CPU 101 determines that the check box 2402 has not been enabled (has not been checked), the process advances to step S2611. In step S2611, the CPU 101 sets the entire image data as the display target of a thumbnail image. In step S2610, the CPU 101 generates a thumbnail image based on the display target region.

In step S2602, the CPU 101 executes region segmentation processing on the image data. In step S2603, the CPU 101 determines whether a region obtained as a result of the region segmentation processing is a single photograph region. If the CPU 101 determines that the obtained region is a single photograph region, it advances to step S2611. If the CPU 101 determines that the obtained region is not a single photograph region, it advances to step S2604.

In step S2604, the CPU 101 obtains the ratio in area between the photograph region and the text region, and determines whether the ratio at which the text region occupies the area is equal to or lower than a predetermined threshold. If the CPU 101 determines that the ratio at which the text region occupies the area is equal to or lower than the predetermined threshold, it advances to step S2605. If the CPU 101 determines that the ratio is higher than the predetermined threshold, it advances to step S2612. In step S2612, the CPU 101 executes the processing according to the second embodiment, and sets part of the text region as the display target of a thumbnail image.

In step S2605, the CPU 101 executes the processing according to the fifth embodiment, and determines whether there is a header region or a footer region. If the CPU 101 determines that there is a header region or a footer region, it executes the processing according to the fifth embodiment in step S2606, excludes the header region or the footer region from the display target of the thumbnail image, and advances to step S2607. If the CPU 101 determines that there is neither a header region nor a footer region, it advances to step S2607.

In step S2607, the CPU 101 executes the processing according to the first embodiment, and specifies the display target region of the thumbnail image. In step S2608, the CPU 101 determines whether the difference between the aspect ratio of the thumbnail image and the aspect ratio of the region specified in step S2607 is larger than a predetermined threshold. If the CPU 101 determines that the difference is larger than the predetermined threshold, it executes the processing according to the fourth embodiment, and performs trimming for extracting the display target region of a thumbnail image in step S2609. In step S2610, the CPU 101 generates a thumbnail image based on the trimmed display target region. If the CPU 101 determines in step S2608 that the difference is not larger than the predetermined threshold (is equal to or smaller than the threshold), it generates in step S2610 a thumbnail image based on the display target region specified in step S2607. After the processing in step S2610, the CPU 101 ends the processing in FIG. 26.

As described above, according to the seventh embodiment, a plurality of regions are detected for respective attributes in an image, and a target region to be included in a thumbnail image is determined among the plurality of regions. In the example of FIG. 5, when a photograph region, a text region, and a margin region are detected in an image, the photograph region and the text region are determined as target regions, and the margin region is excluded. In the example of FIGS. 20A to 20C, when a footer region is detected in addition to a photograph region, a text region, and a margin region, the footer region is also excluded in addition to the margin region.

In this manner, according to the seventh embodiment, when two regions are detected, whether the target region includes both or only one of them is determined in accordance with the attributes of the respective regions. For example, when a photograph region and a text region are detected, the target region includes both of them. When a photograph region and a margin region are detected, the target region includes only the photograph region.

When a photograph region and a text region are detected, as described above, for example, only the photograph region can be set as the target region of a thumbnail image. However, a user who sees the thumbnail image sometimes specifies a desired image based on the contents of the photograph region and text region and their positional relationship. In such a case, the thumbnail image visibility of the user can be improved by including both of these two regions in the thumbnail image.

The respective embodiments have been explained above. However, a thumbnail image is generated not only in the information processing apparatus 100 but also in the service 204 on the Internet 203. A bitmap image serving as the display target of a thumbnail image in each embodiment is generated from, for example, an image input apparatus such as a scanner or a camera in some cases. In other cases, a bitmap image is generated by rendering a file saved in an application-specific format, such as an Office document or a PDF file. When the specific format includes information of a text region, photograph region, and background region, the information of them may be used, instead of region segmentation processing as described in the first embodiment.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-164532, filed Aug. 12, 2014, which is hereby incorporated by reference herein in its entirety.

What is claimed is:

1. An information processing apparatus comprising:
a memory configured to store a program;
at least one processor to execute the program;
wherein the at least one processor, while executing the program:
detects a plurality of regions corresponding to respective attributes in a predetermined image, by analyzing predetermined image data of the predetermined image;
determines one or more regions included in a target region serving as a thumbnail image, out of the detected plurality of regions; and
generates thumbnail image data corresponding to the target region including the one or more determined regions,
wherein the at least one processor determines, based on a first attribute obtained by the analysis of predetermined image data of a first region out of the plurality of regions and a second attribute, different from the first attribute, obtained by the analysis of predetermined image data of a second region out of the plurality of regions, whether both of the first region and the second region are included in the target region or only one of the first region and the second region is included in the target region.

2. The apparatus according to claim 1, wherein the at least one processor further executes a display control for controlling a display apparatus to display the thumbnail image of the predetermined image based on the generated thumbnail image data.

3. The apparatus according to claim 2, wherein a thumbnail image obtained by performing reduction processing on the predetermined image data is displayed in addition to a thumbnail image based on the thumbnail image data generated by the generation.

4. The apparatus according to claim 2, wherein the at least one processor executes the display control for displaying, in a switchable way, a thumbnail image based on the thumbnail image data generated by the generation, and a thumbnail image obtained by performing reduction processing on the predetermined image data.

5. The apparatus according to claim 1, wherein, in a case where the first attribute and the second attribute are included in predetermined attributes, the at least one processor determines that both of the first region and the second region are included in the target region, and
wherein, in a case where the first attribute is included in the predetermined attributes and the second attribute is not included in the predetermined attributes, the at least one processor determines that the first region is included in the target region and the second region is not included in the target region.

6. The apparatus according to claim 5, wherein, in a case where the first attribute and the second attribute are included in predetermined attributes, the at least one processor generates thumbnail image data corresponding to a rectangular region circumscribing both of the first region and the second region.

7. The apparatus according to claim 5, wherein an attribute of a margin is not included in the predetermined attributes, and
the at least one processor determines the one or more regions which do not include a margin region, out of the detected plurality of regions.

8. The apparatus according to claim 7, wherein in a case where the at least one processor detects a margin region and a text region as the first region and the second region, the at least one processor determines the one or more regions including a partial region of the text region.

9. The apparatus according to claim 5, wherein the at least one processor further makes the determination based on at least one of a size of each of the first region and the second region, and a position of each of the first region and the second region in the predetermined image, and
in a case where the at least one of the size and the position satisfies a predetermined condition, the at least one processor determines that the first region is included in the target region and the second region is not included in the target region, even if the first attribute and the second attribute are included in the predetermined attributes.

10. A control method to be performed by executing, using at least one processor of an information processing apparatus, a program stored in a memory of the information processing apparatus, the method comprising:
detecting a plurality of regions corresponding to respective attributes in a predetermined image, by analyzing predetermined image data of the predetermined image;
determining one or more regions included in a target region serving as a thumbnail image, out of the detected plurality of regions; and
generating thumbnail image data corresponding to the target region including the determined one or more regions,
wherein in the determination, whether both of a first region and a second region are included in the target region or one of the first region and the second region is included in the target region is determined based on a first attribute obtained by the analysis, of the first region out of the plurality of regions and a second attribute different from the first attribute, obtained by the analysis, of the second region out of the plurality of regions.

11. The method according to claim 10, further comprising controlling a display apparatus to display the thumbnail image of the predetermined image based on the thumbnail image data generated in the generation.

12. The method according to claim 11, wherein a thumbnail image obtained by performing reduction processing on the predetermined image data is displayed in addition to a thumbnail image based on the thumbnail image data generated in the generation.

13. The method according to claim 11, wherein a thumbnail image based on the thumbnail image data generated in the generation, and a thumbnail image obtained by performing reduction processing on the predetermined image data are displayed in a switchable way.

14. The method according to claim 10, wherein, in a case where the first attribute and the second attribute are included in predetermined attributes, it is determined that at least one processor determines that both of the first region and the second region are included in the target region, and
wherein it is determined that the first region is included in the target region and the second region is not included in the target region, in a case where the first attribute is included in the predetermined attributes and the second attribute is not included in the predetermined attributes.

15. The method according to claim 14, wherein in the generation, thumbnail image data corresponding to a rectangular region circumscribing both of the first region and the second region is generated, in a case where the first attribute and the second attribute are included in predetermined attributes.

16. The method according to claim 14, wherein an attribute of margin is not included in the predetermined attributes, and
in the determination, the one or more regions which do not include a margin region is determined, out of the plurality of regions detected in the detection.

17. The method according to claim 16, wherein in the determination, in a case where a margin region and a text region are detected in the detection as the first region and the second region, the one or more regions including a partial region of the text region is determined.

18. The method according to claim 14, wherein in the determination, the determination is further made based on at least one of a size of each of the first region and the second region, and a position of each of the first region and the second region in the predetermined image, and
in a case where the at least one of the size and the position satisfies a predetermined condition, it is determined that the first region is included in the target region and the second region is not included in the target region, even if the first attributes and the second attribute are included in the predetermined attributes.

19. The method according to claim 14, wherein the predetermined attributes includes an attribute corresponding to a text and an attribute corresponding to an image.

20. A non-transitory computer-readable storage medium storing a program for causing a computer to execute a method, the method comprising:
detecting a plurality of regions corresponding to respective attributes in a predetermined image, by analyzing predetermined image data of the predetermined image;
determining one or more regions included in a target region serving as a thumbnail image, out of the plurality of regions detected in the detection; and
generating thumbnail image data corresponding to the target region including the one or more regions determined in the determination,
wherein in the determination, whether both of a first region and a second region are included in the target region or one of the first region and the second region is included in the target region is determined based on a first attribute obtained by the analysis, of the first region out of the plurality of regions and a second attribute different from the first attribute, obtained by the analysis, of the second region out of the plurality of regions.

\* \* \* \* \*